(12) United States Patent
Ellis

(10) Patent No.: US 6,556,148 B2
(45) Date of Patent: Apr. 29, 2003

(54) EMERGENCY FLASHING LIGHT MECHANISM

(76) Inventor: Christ G. Ellis, 4705 Lakeland Ave., Minneapolis, MN (US) 55429

( * ) Notice: Subject to any disclaimer, the term of this patent is extended or adjusted under 35 U.S.C. 154(b) by 0 days.

(21) Appl. No.: 10/038,434

(22) Filed: Jan. 3, 2002

(65) Prior Publication Data

US 2002/0126022 A1 Sep. 12, 2002

Related U.S. Application Data

(63) Continuation of application No. 09/426,739, filed on Oct. 26, 1999, now Pat. No. 6,356,210, which is a continuation-in-part of application No. 08/936,640, filed on Sep. 24, 1997, now Pat. No. 5,973,618.
(60) Provisional application No. 60/026,919, filed on Sep. 25, 1996.

(51) Int. Cl.[7] ............................................. G08G 1/123
(52) U.S. Cl. ..................... 340/990; 340/906; 340/907; 342/24
(58) Field of Search ................................ 340/990, 901, 340/906, 907, 917; 342/24; 180/167

(56) References Cited

U.S. PATENT DOCUMENTS

| | | | | |
|---|---|---|---|---|
| 4,025,922 A | * | 5/1977 | Trawick, III | 342/24 |
| 4,573,049 A | * | 2/1986 | Obeck | 340/924 |
| 4,775,865 A | * | 10/1988 | Smith et al. | 340/906 |
| 4,914,434 A | * | 4/1990 | Morgan et al. | 340/906 |
| 5,014,052 A | * | 5/1991 | Obeck | 340/906 |
| 5,083,125 A | * | 1/1992 | Brown et al. | 340/906 |
| 5,345,232 A | * | 9/1994 | Robertson | 340/906 |
| 5,509,082 A | * | 4/1996 | Toyama et al. | 382/104 |
| 5,539,398 A | * | 7/1996 | Hall et al. | 340/907 |
| 5,889,475 A | * | 3/1999 | Klosinski et al. | 340/902 |
| 5,926,113 A | * | 7/1999 | Jones et al. | 340/906 |
| 5,973,618 A | | 10/1999 | Ellis | |
| 6,218,964 B1 | | 4/2001 | Ellis | |

* cited by examiner

Primary Examiner—John Tweel
(74) Attorney, Agent, or Firm—Haugen Law Firm PLLP

(57) ABSTRACT

An emergency flashing light mechanism includes one or more emergency flashing lights, a processor, a transmitter, and a receiver. The emergency light flashing mechanisms can exchange information with the vehicles, pedestrians and other components of a traffic complex via their respective transmitters and receivers. The emergency flashing light mechanisms can process such information and override control lights having red, yellow and green lights. The emergency flashing lights can selectively respond to emergency vehicles.

23 Claims, 29 Drawing Sheets

TRAFFIC COMPLEX

COMMUNICATION IN TRAFFIC COMPLEX

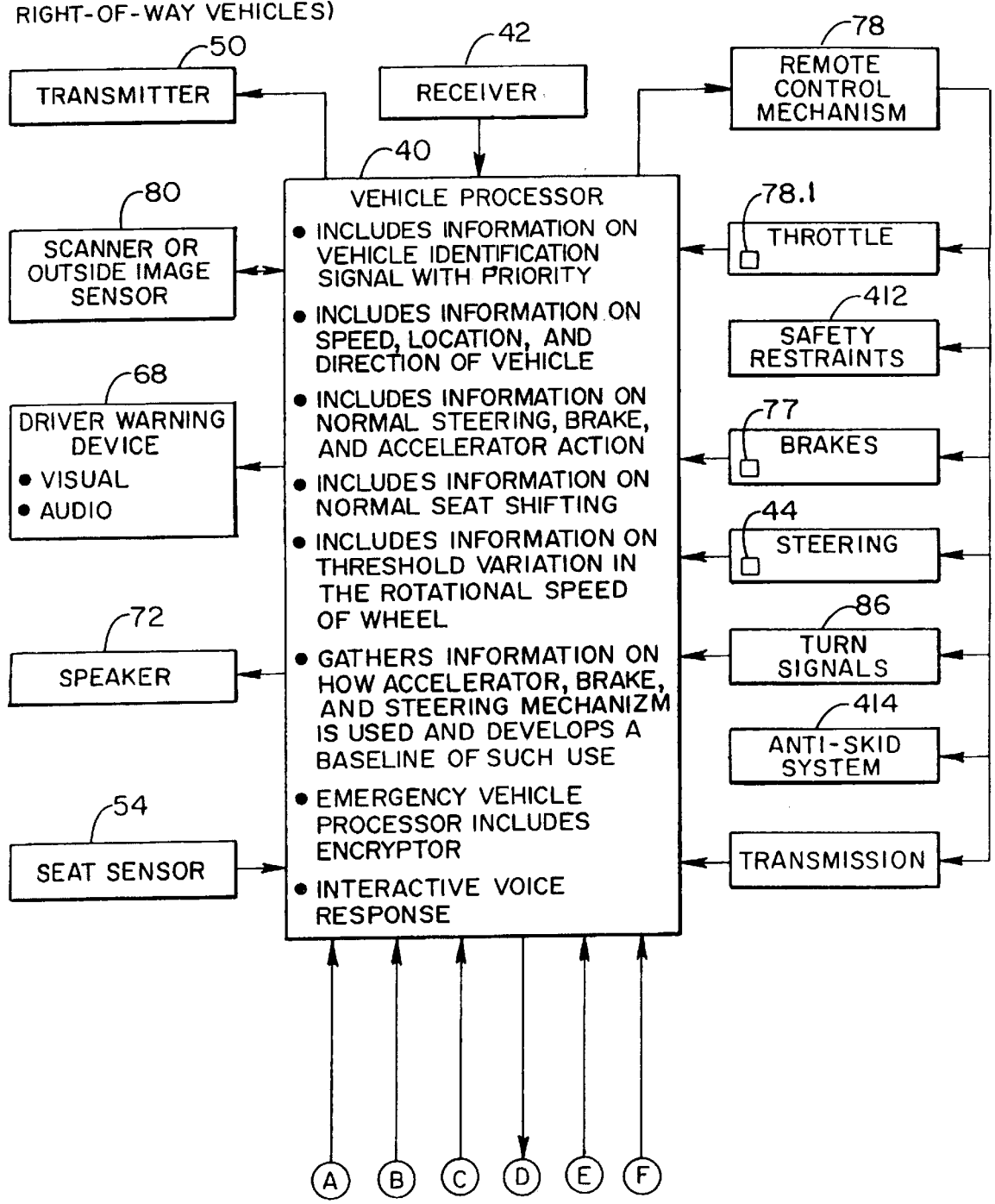

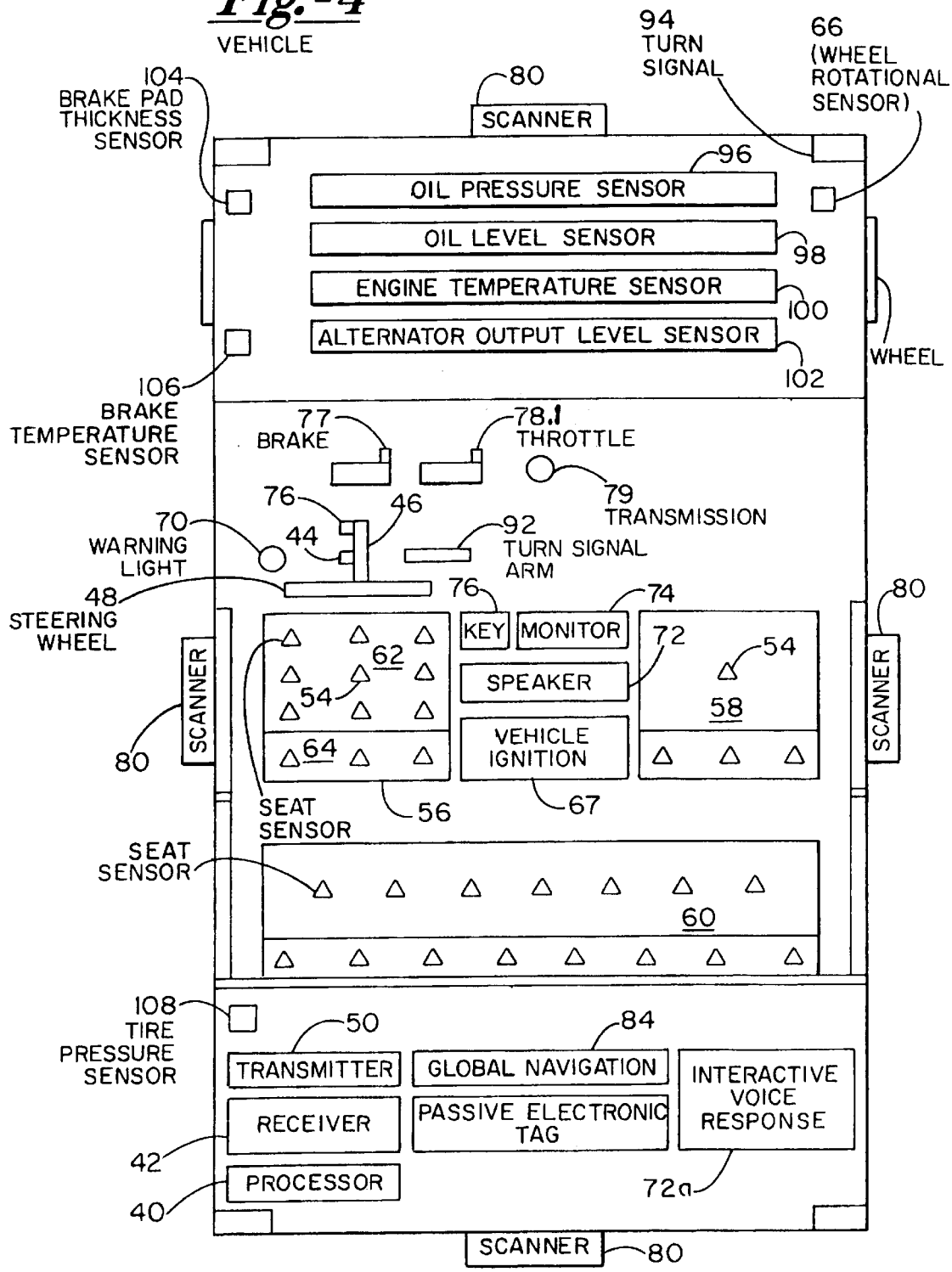

EMERGENCY FLASHING LIGHT MECHANISM

CONTROL LIGHT MECHANISM

VIDEO/AUDIO SURVEILLANCE AND ALARM EQUIPMENT

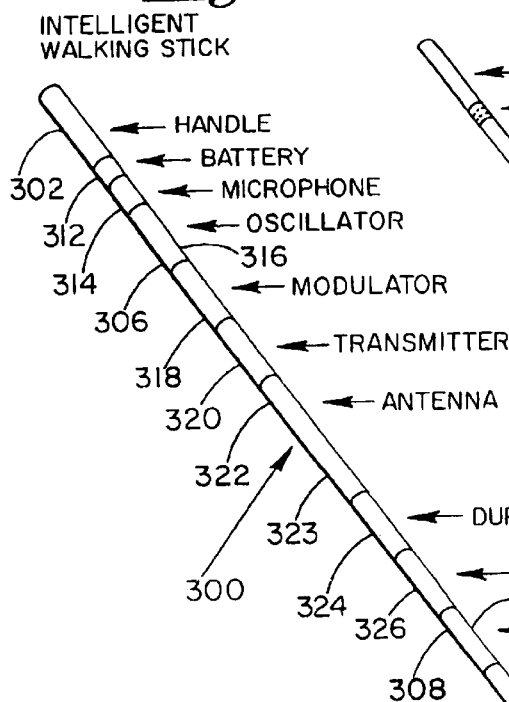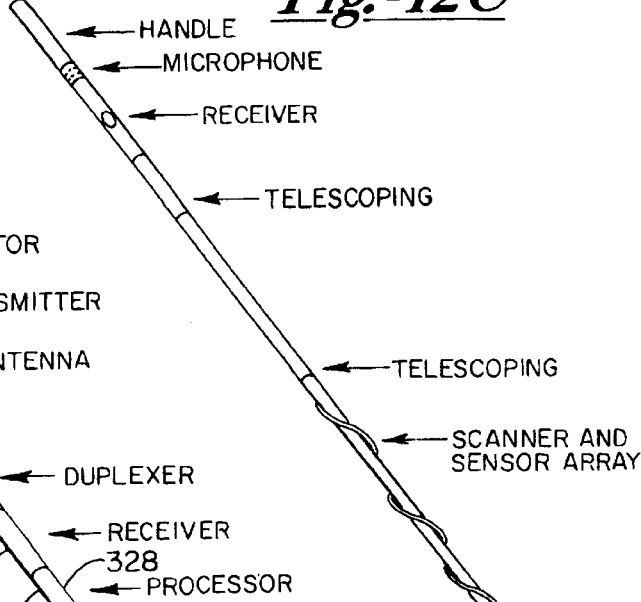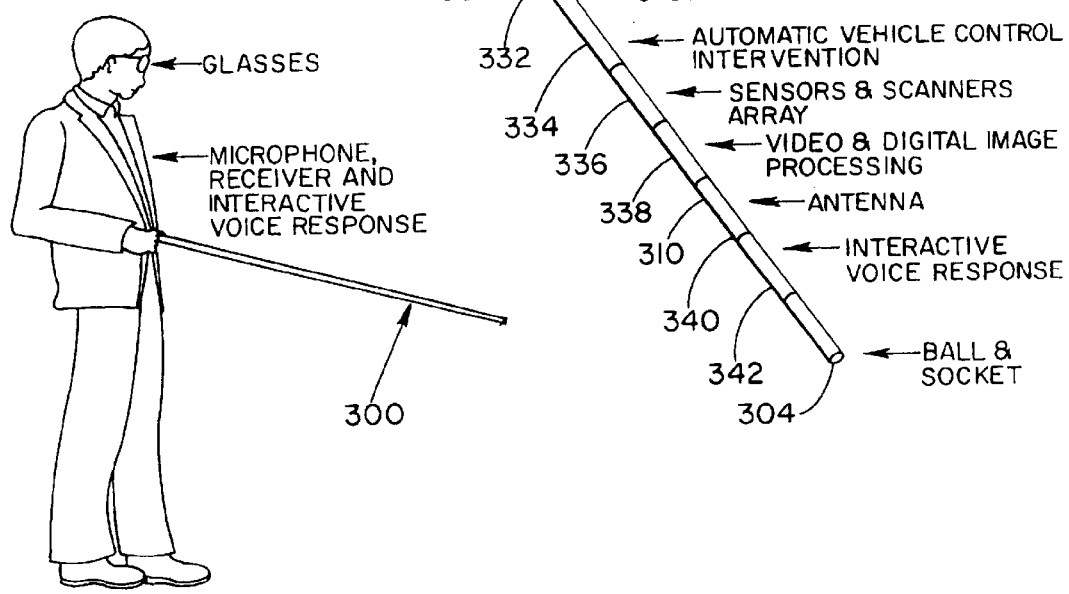

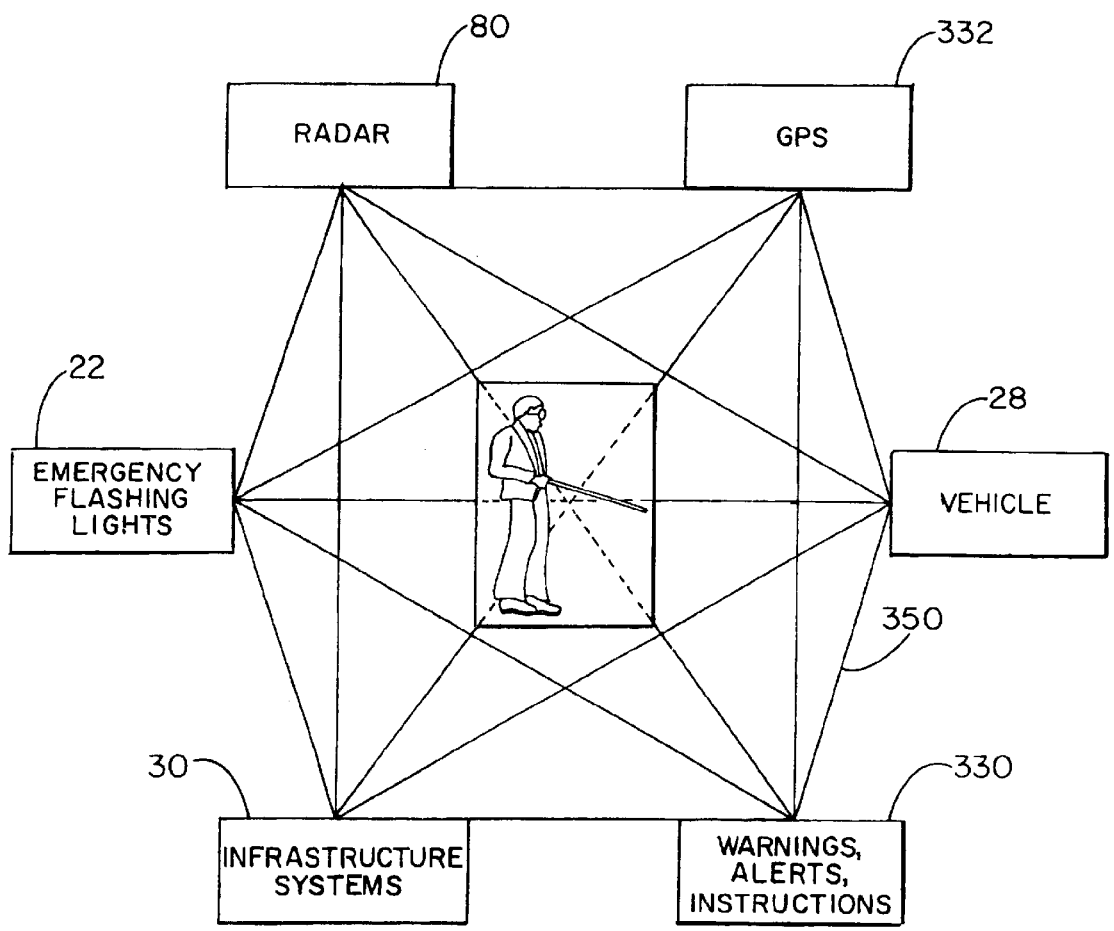

ANTISKID SYSTEM

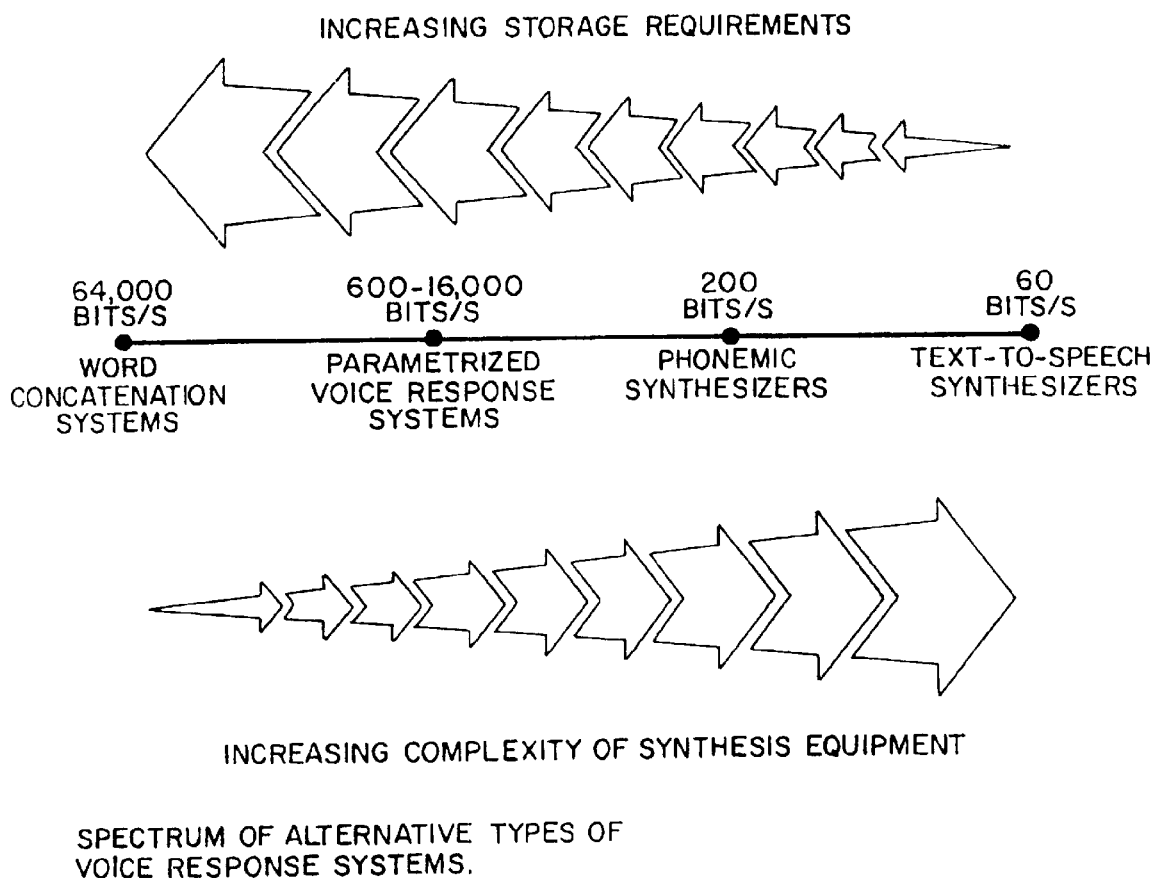
Fig.-18 *(PRIOR ART)*
INTERACTIVE VOICE RESPONSE
SPECTRUM OF ALTERNATIVE TYPES OF VOICE RESPONSE SYSTEMS.

INTERACTIVE VOICE RESPONSE

VOICE RESPONSE SYSTEM WHICH IS BASED UPON CONCATENATION OF WORDS SPOKEN BY A HUMAN.

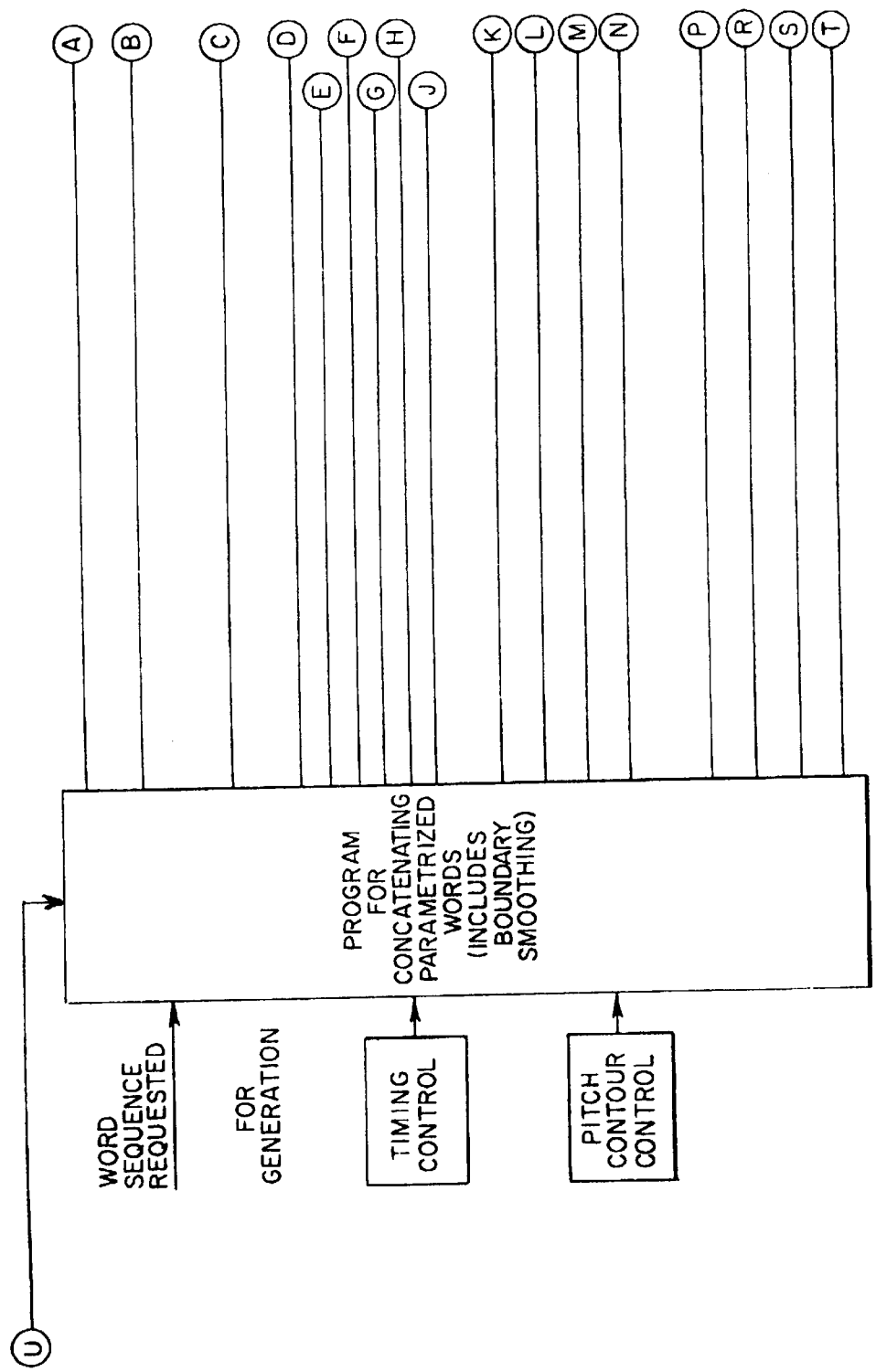

INTERACTIVE VOICE RESPONSE

TEXT TO SPEECH SYSTEM FOR GENERATING COMPLEX SENTENCES WITH LARGE VOCABULARIES

BASIC COMPONENTS OF A SINGLE CIRCUIT BOARD SPEECH SYNTHESIZER, BASED ON THE LINEAR PREDICTIVE CODING (LPC) METHOD FOR MODELING HUMAN VOCAL PRODUCTION PROCESSES.

EMERGENCY FLASHING LIGHT MECHANISM

This application is a continuation, under Title 35, United States Code §120, of U.S. patent application Ser. No. 09/426,739 filed Oct. 26, 1999 and entitled Portable Safety Mechanism With Voice Input and Voice Output now U.S. Pat No. 6,356,210 which in turn was a continuation-in-part, under Title 35, United States Code §120, of U.S. patent application Ser. No. 08/936,640 filed Sep. 24, 1997 and entitled Intelligent Walking Stick (now U.S. Pat. No. 5,973,618 issued Oct. 26, 1999), which in turn claimed the benefit under Title 35, United States Code §119(e) of U.S. Provisional Patent Application No. 60/026,919 filed Sep. 25, 1996 and entitled Control Avoidance, Traffic Control, Safety, And Information Systems.

BACKGROUND OF THE INVENTION

The present invention relates generally to collision avoidance, traffic control, incident detection & management, interactive voice response communications, automated vision enhancement systems, safety, and information systems, apparatus, and methods. More particularly, the present invention relates to portable safety mechanisms such as intelligent walking sticks.

SUMMARY OF THE INVENTION

An object of the present invention includes equipping infrastructure-to-vehicle and infrastructure to pedestrian systems with radio transmitters, receivers, processors, sensors, scanners, displays, integrated interactive voice response communications, automated vision enhancement systems, and warning devices, all of which interact, and are integrated.

Another object of the present invention includes equipping infrastructure-to-vehicle and infrastructure to pedestrian systems with collision avoidance, traffic control, incident detection and management, automated and superimposed and/or fused vision enhancement, safety, and information systems.

Another object of the present invention includes equipping infrastructure-to-vehicle and infrastructure to pedestrian systems with and feeding voice, video, and data transmissions from monitoring sensors into computer-based decision support algorithms which will analyze the fused transmissions from all sources and advise and/or initiate appropriate predetermined response plans.

Another object of the present invention includes vision enhancement implemented through in-vehicle and on-person sensors capable of sensing the outside scene, dynamically overlaying the sensed and imaged scene on the front windshield, and providing information through interactive voice response communications.

Another object of the present invention is to provide unique portable safety mechanisms for being carried by pedestrians. A portable safety mechanism includes a transmitter, receiver, outside image sensor, warning device, silent alarm, microphone, and position locator. The portable safety mechanism may be embedded or attached to a cane or other walking stick, or may be belted or strapped to pedestrians such as those who are blind or hearing impaired.

Another object of the present invention is to provide unique methods for relating the portable safety mechanism to other features of the traffic complex such as the vehicles, infrastructure control mechanisms, emergency flashing light mechanisms, traffic control lights, and to certain video/audio surveillance equipment, and to alarms.

Another object of the present invention is to provide unique passive electronic tags embedded in stationary or moving objects of the traffic complex to provide information, readable such as by approaching vehicles, on the respective object.

Another object of the present invention is to provide unique methods for relating the electronic tags to features of the traffic complex such as approaching vehicles.

Another object of the present invention is to transmit electromagnetic energy into the surroundings and detect energy reflected by objects so as to convert invisible images into visible images.

Other objects of the present invention with respect to the intelligent walking stick or portable safety mechanism include the following:

to transmit electromagnetic energy into the surroundings and detect energy reflected by objects;

to convert invisible images into visible images;

to provide coordinates of the immediate scene and permit the precise mathematical correlation of the surrounding scene and earth science data;

to locate the position of a threatening vehicle(s);

to provide directions to desired destinations, with data continuously updated via wireless modems;

to produce an overlaid dynamic map of the intermediate area;

to determine if vehicle control-intervention will be activated to avoid an accident;

to activate vehicle control-intervention;

to determine if antiskid system on vehicle will be activated;

to dispense antiskid chemicals and particles over and around tires as needed;

to employ forward-looking radar to determine road conditions ahead of vehicle;

to receive transmitted signals from advancing and threatening vehicles and trains;

to transmit an electronic notification of the intent to cross a roadway;

to employ energy absorbed, reflected, and emitted to warn of danger and to instruct;

to employ in-vehicle displays, local variable message signs, emergency flashing lights, broadcasting, interactive voice response, and video monitors to warn of danger and instruct;

to convert sensed and imaged scenes into dynamic audible displays, providing information and "sight;"

to enhance dynamic vision of imaged and scanned scene, when warning signals are received, focusing on the area of danger;

to employ regular charge-coupled device cameras for vision enhancement when an external light source is employed;

to employ energy absorbed, emitted and reflected for vision enhancement;

to produce dynamic images that overlay on glasses, goggles, and shields;

to sense and communicate when it is safe to cross a street and when it is not;

to employ video and digital image processing to recognize traffic signals;

to receive warnings and instructions from active and passive electronic tags and infrastructure-based components located around obstructions and hazards; and to convert sensed and imaged foods into audible displays and images that overlay on glasses, goggles, and shields, to provide information, sight, and location to assist the sight impaired while eating.

These and further objects and advantages of the present invention will become clearer in light of the following detailed description of the illustrative embodiments of this invention described in connection with the drawings.

BRIEF DESCRIPTION OF THE DRAWINGS

FIGS. 3A and 3B are diagrammatic views of the interplay between features of the vehicle of the present invention.

FIG. 4 is a diagrammatic top view of the vehicle of FIGS. 3A and 3B.

FIG. 12A is an environmental view of a person carrying the preferred embodiment of the portable safety mechanism or intelligent walking stick.

FIG. 12B is an elevation, partially schematic view of the preferred embodiment of the intelligent walking stick of FIG. 12A.

FIG. 12C is an elevation, partially schematic view of the slightly different embodiment of the intelligent walking stick of FIG. 12B.

FIG. 13 is a diagrammatic view of the interplay between the intelligent walking stick of FIG. 12B with radar, emergency flashing lights, infrastructure systems, warnings, alerts, and instructions, vehicles, and global navigation systems.

FIG. 18 is a diagrammatic view of a prior art spectrum of alternative types of voice response systems.

FIGS. 20A, 20B and 20C are prior art flow charts for a parametrized voice response system based on formant analysis and resynthesis.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

DESCRIPTION

A. The Traffic Complex 10 and FIGS. 1 and 2

Figure 1:
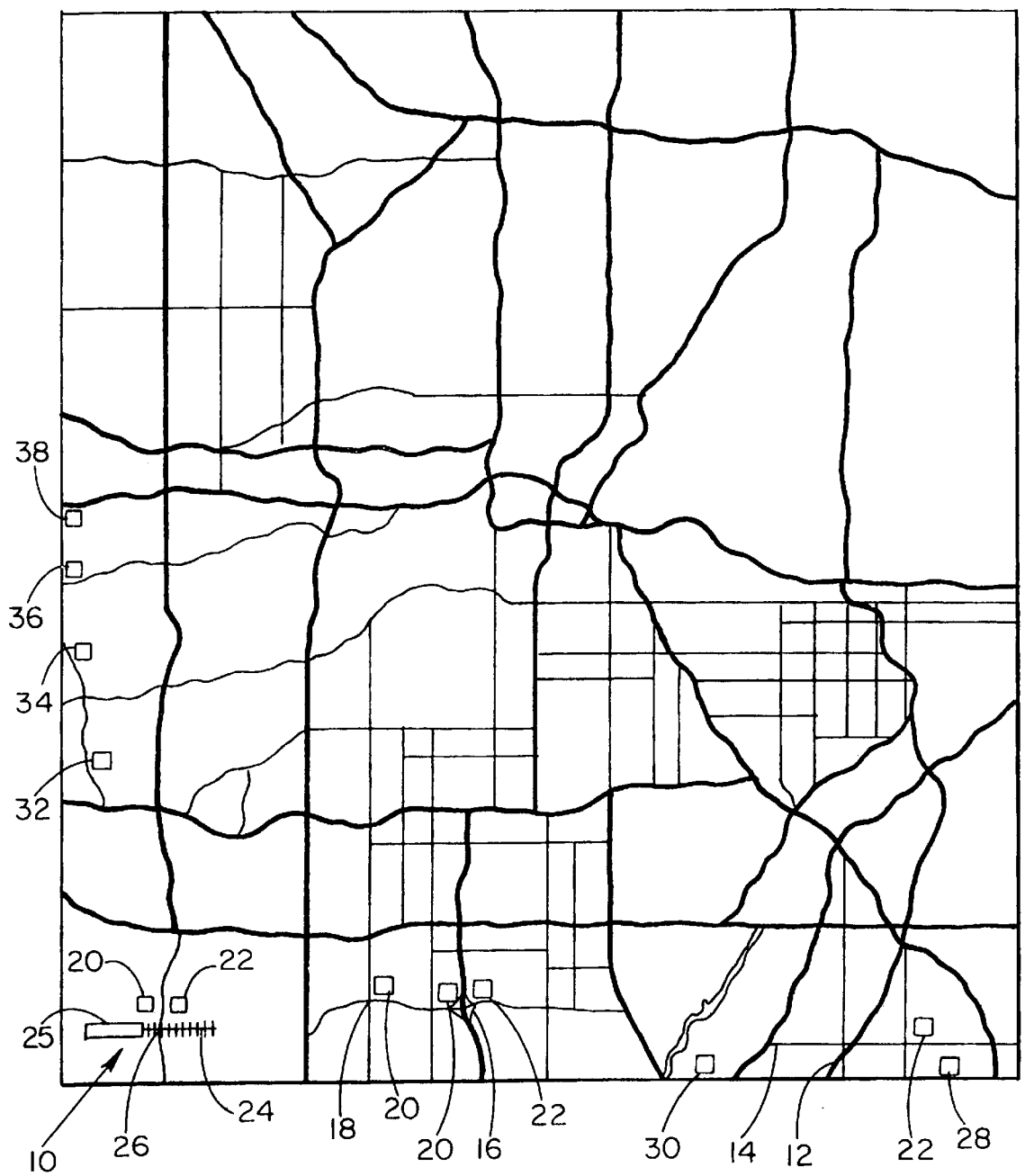
FIG. 1 is a diagrammatic view of a traffic complex.

FIG. 1 is a map illustrating a traffic complex 10 of a portion of the Minneapolis/St. Paul metropolitan area. The traffic complex 10 includes major thorough ways 12 such as Interstate 35E which is a divided multi-lane interstate highway, and more minor thorough ways 14. Entrance ramps 16, shown enlarged in one location in FIG. 1, feed vehicles from the minor thorough ways onto the major thorough ways. Intersections 18 between the relatively minor thorough ways 14 may include control light mechanism 20 and/or emergency light flashing mechanisms 22. Further, the traffic complex 10 may include tracks 24 such as train tracks for trains 25, creating track and vehicle thorough way intersections 26. Such an intersection 26 may also include control light mechanisms 20 and/or emergency light flashing mechanisms 22. Further, the entrance ramps 16 may include control light mechanisms 20 and/or emergency light flashing mechanisms 22. The traffic complex 10 may further include vehicles 28, infrastructure control mechanisms 30, electronic tags 32 engaged to hazards or obstructions, video and/or audio surveillance equipment 34 which include alarms, portable safety mechanisms 36 carried by pedestrians, bicyclists, handicapped and impaired persons, and emission sensor mechanisms 38.

Figure 2:
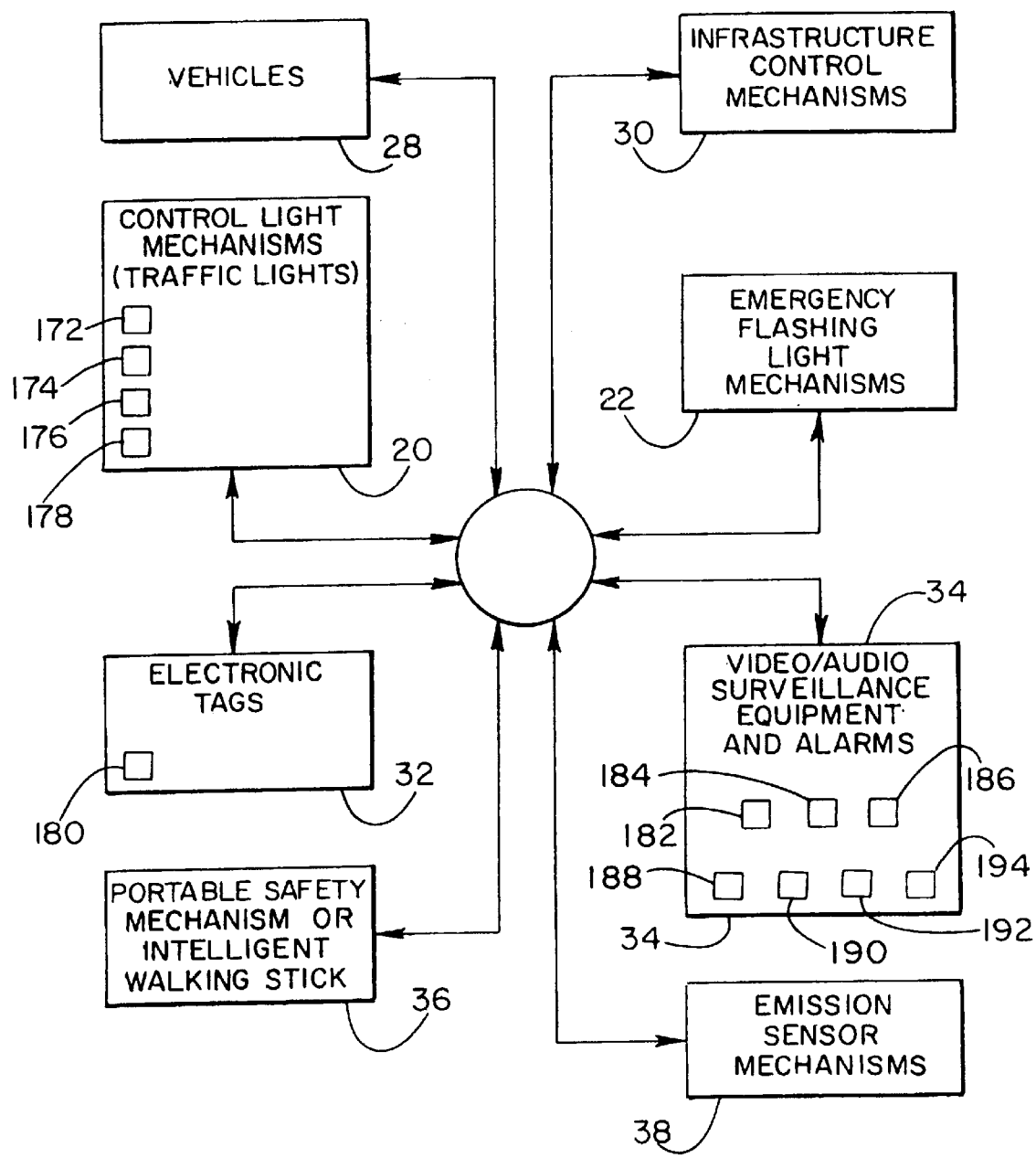
FIG. 2 is a diagrammatic view of the communication between features of traffic complex, including the vehicles, infrastructure control mechanisms, control lights, emergency flashing light mechanisms, electronic tags, video/audio surveillance equipment and alarms, portable safety mechanism, and emission sensor mechanisms.

As indicated by the schematic of FIG. 2, each of the main components of the traffic complex 10 may communicate with each of the other main components. In other words, each of the vehicles 28, each of the infrastructure control mechanisms 30, each of the control lights 20, each of the emergency flashing light mechanisms 22, each of the electronic tags 32, each of the video/audio surveillance and alarm equipment 34, each of the portable safety mechanisms or intelligent walking sticks 36, and each of the emission sensor mechanisms 38 may communicate with another mechanism within its own group and/or communicate with a mechanism outside its own group. Such communication may take place via the transmitters and receivers of the components or through electrical lines or optical cables connecting the stationary components such as the emergency light flashing mechanisms 22, control lights 20, electrical tags 32, video/audio surveillance and alarm equipment 34, infrastructure control mechanisms 30, and emission sensor mechanisms 38. Further such communication can take place via the transmitters, receivers, sensors, scanners, displays, interactive voice response systems, and warning devices, and through electrical lines and optical cables connecting some of the stationary components.

It should be noted that the control light mechanism 20 may be referred to as infrastructure safety and information mechanism or system 20. It should further be noted that the infrastructure control mechanism 30 may be an emergency light flashing mechanism 22 or an infrastructure safety and information mechanism 20. In other words, "infrastructure control mechanism" is a relatively broad name for an emergency light flashing mechanism 22, a control light mechanism 20, an electrical tag mechanism 32, a video/audio surveillance and alarm equipment mechanism 34, an emission sensor mechanism 38, or some other mechanism which includes a processor, transmitter, receiver, and performs some output so as to affect some portion of the traffic complex.

All vehicles (non-emergency vehicles, right-of-way vehicles, and trains) are equipped with: 1) mobile radio transmitters, receivers, processors, sensors, scanners, in-vehicle displays, integrated interactive voice response systems, and warning devices, all of which interact, and are integrated; and 2) collision avoidance, traffic control, incident detection and management, safety, and information systems. Such equipment feeds voice, video, and data transmissions from monitoring sensors into computer-based decision support algorithms which analyze the fused transmissions from all sources and advise and/or initiate appropriate predetermined response plans.

B. The Vehicle 28 and FIGS. 3A, 3B and 4

Figure 3B:
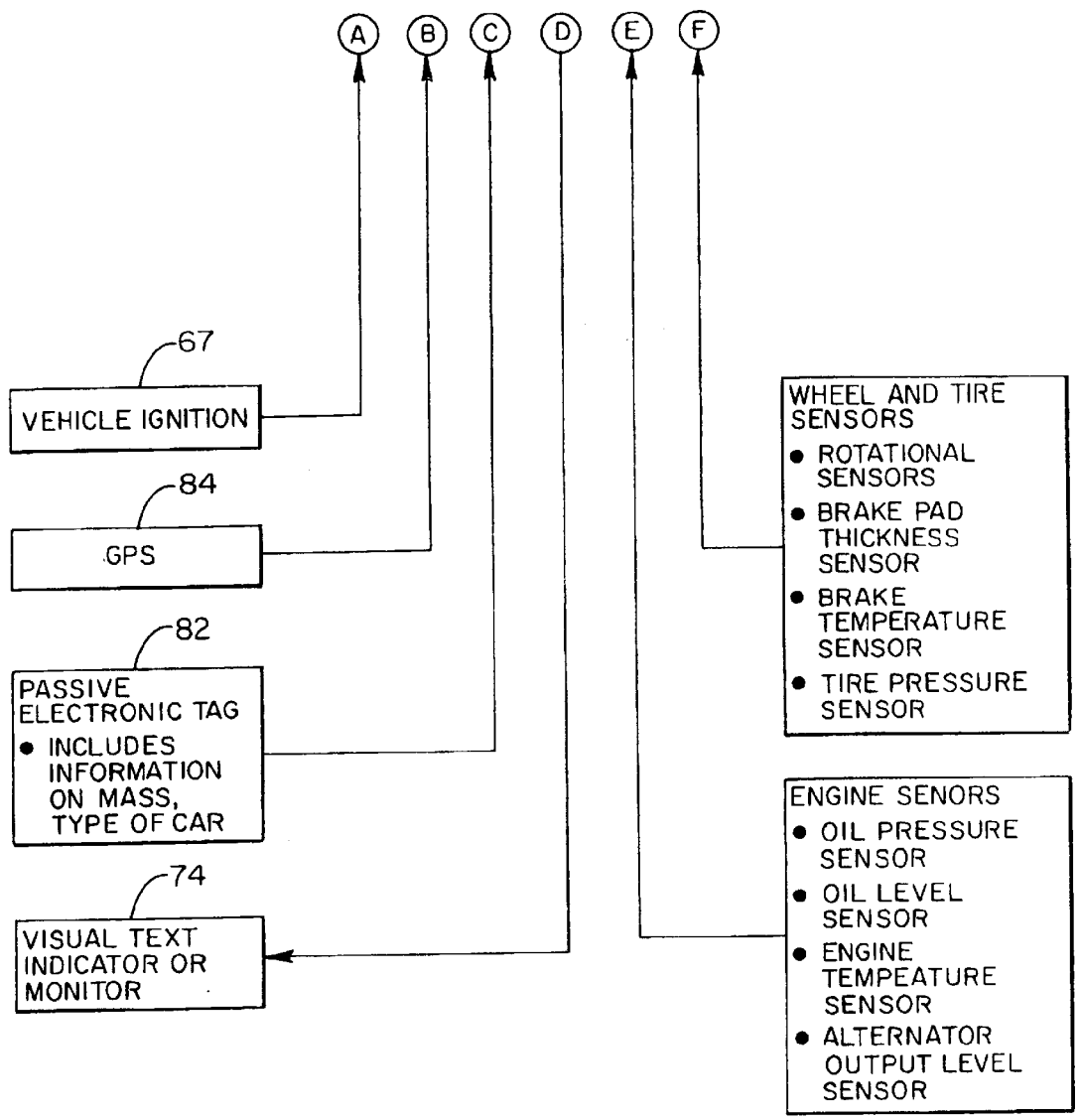

FIGS. 3A and 3B show the interrelationship between features of a vehicle 28 traveling on the traffic complex 10. Preferably, each of the vehicles 28 in the traffic complex 10 includes the features of vehicle 28. FIG. 4 shows a sample location for each of the features in vehicle 28.

B.1. The Vehicle Processor

Vehicle 28 includes a processor or computer 40. As to the vehicle processor or computer 40, such may be a common personal computer.

The computer or processor 40 includes information on the owner of the vehicle, the make and model of the vehicle including vehicle weight. The computer 40 further includes a unique identification signal which permits an identification of the vehicle by the computer 40 of another vehicle or by another computer such as one in an infrastructure control mechanism 30. Such an identification signal carries with it a priority such that an emergency flashing light mechanism 22 may determine which emergency vehicle is awarded the right-of-way when two or more emergency vehicles approach an intersection at about the same time.

The computer 40 further includes information on the speed, location and direction of its vehicle. Information on the speed of the vehicle may be taken in digital form from the speedometer, or taken in analog form and converted to digital form. Information on location of the vehicle may received via the receiver 42, which receives such information in digital form from electronic tags 32, which are engaged at a plurality of locations in the traffic complex 10. Information on direction is gathered by the computer 40 by comparing and processing information gathered from two or more electronic tags 32. Or information on the speed, location, and direction of the vehicle 28 may be gathered from the global positioning system 84.

The computer 40 further includes information on normal steering actions by one or more drivers of the vehicle. Such information may be gathered in analog and/or digital form by a sensor 44 engaged to the steering column 46 of the steering wheel 48. Such sensor 44 may sense the number and rate of rotation of the steering shaft in the steering column 46 as well as the direction of rotation. The computer 40 may continuously gather information from the sensor 44, process such information in relation to the driver, and develop a baseline for normal steering actions. The computer 40 may further compare such a baseline with present driving actions and transmit information via the transmitter 50 to police authorities should the present driving actions vary beyond the baseline. As to such a rotation sensor 44, U.S. Pat. No. 5,568,048 is hereby incorporated by reference in its entirety.

The computer 40 further includes information on normal brake and accelerator action. Such information may be gathered in analog and/or digital form by a throttle sensor 78.1 and a brake sensor 77. The throttle sensor 78.1 may be engaged to the conventional accelerator foot pedal and the brake sensor 77 may be engaged to the conventional brake foot pedal of a car. As with the steering mechanism sensor 44, the computer 40 may continuously gather information from the sensors 77 and 78.1, process such information in relation to the driver, and develop a baseline for normal throttle and brake actions. The computer 40 may further compare such a baseline with present driving actions and transmit information via the transmitter 50 to the police authorities should the present driving actions vary beyond the baseline. As to such sensors 77 and 78.1, respective U.S. Pat. Nos. 4,649,340 and 5,637,997 are hereby incorporated by reference in their entireties.

The computer 40 further includes information on normal seat shifting actions. Such information may be gathered in analog and/or digital form by one or more seat sensors 54 placed in one or more of a driver seat 56, a front passenger seat 58, and a rear passenger seat 60. Such sensors 54 may be placed in a seat portion 62 and/or a back support portion 64 of the seats 56, 58, 60. Such sensors 54 may be weight sensors, triggered by the weight of a passenger or object on the seat. As with the other sensors, the computer 40 may continuously gather information from the sensors 54, process such information in relation to the driver, and develop a baseline for normal seat shifting actions. The computer 40 may further compare such a baseline with present driving actions and transmit information via the transmitter 50 to the police authorities should the present driving actions vary beyond the baseline. As to such seat sensors, U.S. Pat. Nos. 5,653,462 and 4,634,179 are hereby incorporated by reference in its entirety.

The computers 40 of emergency or law enforcement vehicles may further include encryption software for encrypting their identification signals so as to minimize tampering with the emergency flashing light mechanisms 22. Such emergency flashing light mechanisms 22 include de-encryption software to decode the identification signals from the emergency vehicles.

The computer 40 further includes information on a threshold variation of the rotational speed of each of the wheels of the vehicle 28. This threshold variation may be determined by the make and model of the vehicle. This threshold variation is compared to the actual rotational speed of each of the wheels, which may be measured by an accelerometer or rotational sensor 66 engaged adjacent to each of the wheels or axles therefor. As to the rotational sensor 66, U.S. Pat. No. 5,544,962 is hereby incorporated by reference in its entirety. As with the other sensors, sensor 66 is electrically engaged and communicates with the computer 40 and sends such information on the rate of rotation of each of the wheels. The computer 40 remotely takes control of the throttling and braking of the vehicle when actual variation in the rotational speed of any of the wheels exceeds the threshold variation in the rotational speed of the wheel.

The processor is found in systems such as collision avoidance, traffic control, incident detection and management, emergency flashing lights, safety readiness, emissions detection and mitigation, and enroute information, and include functions such as vision enhancement, vehicle control intervention, and the pre-emption of traffic signals. The processor interacts with and manages equipment and systems such as transmitters, receivers, sensors, scanners, warning devices, in-vehicle displays, and interactive voice response systems. Voice, video, and data transmissions from monitoring sensors feed into computer-based decision support algorithms which analyze the fused transmissions from all sources and advise and/or initiate appropriate predetermined response plans.

The processors or computers of the present invention are designed and programmed to receive real-time data (analog or digital) from transducers, sensors, and other data sources that monitor a physical process. The processor can also generate signals to elements that control the process. For example, a processor might receive data from a gauge, compare the data with a predetermined standard, and then produce a signal that operates a valve.

B.2. The Vehicle Receiver and Transmitter

Vehicle 28 includes the receiver 42 and transmitter 50 for communicating with other features of the traffic complex 10, as shown in FIG. 4. These features include the infrastructure control mechanisms 30, the control lights 20, the emergency flashing light mechanisms 22, the electronic tags 32, the video/audio surveillance and alarm equipment 34, portable safety mechanisms 36, and emission sensor mechanisms 38. The receiver 42 and transmitter 50 include signal modulation and control elements.

The transmitter 50 may be a radio transmitter such as a conventional low-range mobile radio RF transmitter or any other suitable signal transmitter (such as an AM, FM, digital, or microwave transmitter), configured to broadcast a limited range warning signal at a selected frequency. Similar radio transmitters are placed on each of the vehicles 28. The selected carrier frequency can be broadcast at a dedicated emergency frequency or can be broadcast across a shared frequency. The warning signal can include information concerning the vehicle, such as speed, direction, route and present location. Additionally, the warning signal can be coded or encrypted to prevent false alarms or unauthorized uses. The transmitters can include signal modulation and control elements, such as attenuators, hybrids, circulators and isolators, so that the range of the signal can be increased or decreased and the broadcast pattern (signal detection) can be changed depending on factors such as the speed of the vehicle transmitting the warning signal and the traffic or weather conditions.

The transmitter 50 may be connected to the starting mechanism or vehicle ignition 67 of vehicle 28, so the transmitter 50 is turned on whenever vehicle 28 is in operation. Therefore, the transmitter 50 continuously broadcasts the warning signal whenever vehicle 28 is in operation. Or the transmitter 50 may be connected to existing warning systems, such as a warning strobe, so the transmitter 50 is active only when its vehicle 28 is in a right-of-way mode, such as when responding to an emergency situation.

Receiver 42 may be a conventional mobile radio receiver, such as a superheterodyne receiver. The receiver 42 may utilize existing elements of vehicle 20, such as a car radio, citizens band radio, or car phone. The receiver 42 may be connected to the starting mechanism 67 of vehicle 28 such that the receiver 42 is turned on (active) whenever the vehicle 28 is in operation.

A warning device 68 is electrically connected to each radio receiver 42. The warning device 68 may include lights, speakers, display screens, or video monitors.

Computer or processor 40 can be an integrated circuit or any other similar data analyzing or comparing device.

Signal input is received by the receiver 42, which is adjusted to monitor the selected frequency. Whenever a warning signal is received, the warning device is alerted and an alert indication is displayed or sounded. To prevent false alert indications, the received signal can be compared with the expected warning signal from the transmitter 50. If the received signal does not match the expected warning signal or a predetermined "signature", that is, a prearranged code or other identifying trait, the receiver 42 returns to its input mode. Only when the received signal is identified as the warning signal is an alert indication produced. The alert indication can include warning sounds or voices, warning lights, images, instructions, messages, displays or any other form of warning.

Further, once the warning signal is received, the warning signal may be analyzed by the processor 40, which may perform functions such as decoding encoded signals, analyzing signal strength or sorting information transmitted by the signal, and determine the appropriate alert indication to be produced by the warning device 68.

A receiver 42 of a respective vehicle 28 can be calibrated to ignore the warning signal produced by the accompanying transmitter in the same vehicle.

The receiver 42, transmitter 50, processor 40, and warning device 68 offer drivers ample warning of a variety of situations. For example, with an approaching right-of-way vehicle, drivers of the other vehicles can pull to the side of the road and stay clear of the right-of-way vehicle. The warning signal can be received at greater distances than the traditional light and siren systems and over visual or acoustic obstructions. The warning signal of the present invention can include information on the speed and location of the right-of-way vehicle. The alert indication produced by the warning display can be fashioned to be noticeable, even to a distracted driver. A more opportune and more complete warning translates to increased reaction time and increased safety for occupants of both right-of-way and normal vehicles. Additionally, advanced warning helps ensure an unobstructed path for the emergency vehicle, thereby allowing faster emergency response times.

B.3. Driver Warning Device

The driver warning device, given the general reference number 68 in FIG. 3A, may be as mentioned above a warning light such as a warning light 70 mounted substantially directly in front of the driver's seat on the dashboard in the vehicle, a speaker such as speaker 72 mounted adjacent the driver's seat, a display screen mounted on the dashboard, or a video monitor such as video monitor 74 mounted adjacent the driver's seat and on which warning messages may be displayed. The warning device 68 communicates with receiver 42 via the processor 40.

One or more of the warning devices 68 may be activated by one or more of a number of incidents or situations. Such situations include a likely collision with another vehicle, an unusually fast approach to a red or yellow control light 20, a speed faster than the speed limit of the thoroughway upon which the vehicle is traveling, the activation of emergency flashing light mechanisms, the approach of an emergency vehicle, a likely collision with a hazard or obstruction, an approach—normal or otherwise—leading to a portable safety mechanism 36 such as may be carried by a pedestrian, bicyclist or an impaired person.

A warning device is connected to a receiver and a processor and produces an alert indication when the receiver receives a warning signal. The processor analyzes the warning signal and determines the appropriate alert indication or instruction to be provided. The warning device can produce visual, sound, or any other suitable alert indication. The alert indications can include warning sounds, warning lights, images, instructions, and/or displays. The received warning signal can be coded or encrypted to prevent false alarms or unauthorized uses.

For example, when a receiver detects an approaching emergency vehicle signal, the processor analyzes the warning signal and determines the appropriate alert indication or instruction to be produced; the warning device produces an alert advising the operator of the vehicle of the approaching emergency vehicle.

Another example relates to vision enhancement where a walking stick and/or on-person sensors and scanners are capable of imaging and sensing the surrounding scene, and video and digital image processing recognize traffic signals and advise when it is safe for an impaired person (child, senior, anyone who carries or wears on-person sensors and scanners) to proceed. When the individual(s) begins to cross a street, surrounding vehicles are warned (advised) of his/her presence and/or controlled to avoid hitting the individual(s).

Further, infrastructure emissions sensors, sensing, identifying and classifying types and levels of emissions from each vehicle (having data relating to undesirable emissions levels, and having data relating the number of vehicles to such undesirable emissions levels) manage emissions levels by automatically rerouting traffic, using in-vehicle displays and in-vehicle interactive voice response to issue instructions and warning so as not to exceed emissions standards.

B.4. The Visual Text Indicator or Video Monitor

As indicated above the visual text indicator or video monitor 74 is connected to and communicates with the processor 40. Monitor 74 is mounted adjacent to the driver's seat. Monitor 74 may act as a warning device, or may display information about a number of features of the traffic complex 10 or vehicle 28. A keyboard 76 may also be placed adjacent to the driver's seat for permitting the driver to interact with the computer 40. Visual text indicator means may be a display showing in rather large lettering—perhaps the size of an average adult hand, text on the dashboard so that it may be easily read by peripheral vision by the driver without the driver taking his or her eyes off the road and so that it captures the attention of the driver relatively easily.

Signal input is received by a receiver which is adjusted to monitor a selected frequency. Processors perform functions such as determining an appropriate alert indication to be produced by the warning device. Whenever a signal is received, an alert indication is displayed. The alert indication produced by an in-vehicle display can be fashioned to be noticeable, even to the distracted driver.

In-vehicle displays are employed for such purposes as warning of an approaching emergency vehicle, the preemption of traffic signals, and to facilitate collision avoidance, traffic control, incident management, vision enhancement, enroute information, emissions mitigation, and navigation.

B.5. The Speaker

The speaker 72 is mounted adjacent to the driver's seat and is one of the warning devices in vehicle 28. The speaker 72 is connected to and communicates with the processor 40. The processor 40 may generate warnings or other messages to be announced by the speaker 72. The processor 40 may include an interactive voice response system 72*a*.

B.6. Remote Control Mechanism

A remote control mechanism 78 may take control of vehicle 28 upon direction by the driver, the processor 40, or some infrastructure control mechanism 30 through the processor 40. The remote control mechanism 78 may operate steering, braking, and throttling, and such is indicated schematically in FIG. 3A. As shown in FIG. 3A, the remote control mechanism 78 is connected to and communicates with the processor 40. As to the remote control mechanism 78, U.S. Pat. No. 4,835,531 is hereby incorporated by reference in its entirety. The remote control mechanism 78 may further operate the transmission 79 of the vehicle 28.

B.7. Outside Image Sensor or Scanner

As shown in FIG. 4, outside image sensors or scanners 80 are fixed to front, rear, and side portions of vehicle 28. As indicated in FIG. 3A, outside image sensor or scanner 80 is connected to and communicates with processor 40. As to outside image sensor or scanner 80, U.S. Pat. Nos. 5,563,602 and 5,264,859 are hereby incorporated by reference in their entireties.

The scanner 80 may sense an image exterior to vehicle 28 and produce a visual display of the image on the monitor 74 or an audible message of the image by the speaker 72. The image may be sensed by forming the image with a passive far infrared mechanism based on identifying differences in thermal energy intensity emanating from different objects. As to passive far infrared scanners, U.S. Pat. Nos. 5,319,350 and 5,249,128 are hereby incorporated by reference in their entireties. Or the image may be constructed with a passive millimeter-wave mechanism based on an object's natural emissions at millimeter-wave frequencies, independent of light conditions. As to the passive millimeter-wave mechanism, U.S. Pat. No. 5,555,036 is hereby incorporated by reference in its entirety. Or an image may be obtained, or the construction of the image may be enhanced by infrared, thermal imagers detecting infrared energy radiated by a warm object and transforming such infrared energy into a visual display. As to thermal imagers, U.S. Pat. No. 5,091,646 is hereby incorporated by reference in its entirety. Or the image may be obtained by an active detection mechanism based on an object's reflection. As to the active detection mechanism, U.S. Pat. No. 4,326,799 is hereby incorporated by reference in its entirety. One or more of the mechanisms may be located at one or more of the front, rear, and side locations of vehicle 28. It should be noted that the images obtained by one or more of the mechanisms may be enhanced with a charge-coupled camera mechanism whose visibility band is extended with external light. As to a charge coupled camera mechanism, U.S. Pat. No. 5,325,412 is hereby incorporated by reference in its entirety.

The active detection mechanism may include active radar or laser radar or optical pulse radar. As to optical pulse radar, U.S. Pat. No. 4,552,456 is hereby incorporated by reference.

Scanner 80 may scan in both the azimuth (horizontal) and elevation (vertical) directions. As to scanning in the azimuth and elevation directions, U.S. Pat. No. 5,341,141 is hereby incorporated by reference in its entirety.

A sensor is a device that converts measurable elements of a physical process into data meaningful to a computer. A sensor-based system is an organization of components including a computer whose primary source of input can be used to control the related physical process.

Sensor technologies for use in automated traffic control, collision avoidance, safety, and information systems work in combination and include the following: microwave radar, millimeter-wave radar, laser radar (also known as LIDAR or light detection and ranging), ultrasound, video image processing; infrared imaging, infrared illumination, ultraviolet illumination, and global positioning systems. Radar systems utilize pulse, pulse Doppler, frequency-modulated continuous-wave (FM-CS), binary phase modulation, and frequency modulation transmission modes.

Sensor technologies include FM communication techniques that use existing infrastructures, spread spectrum two-way radio, microwave and infrared beacon, cellular radio, and transponder-based vehicle-to-roadside systems.

In collision avoidance, traffic control, incident detection and management, safety, and information systems, sensors feed into computer-based decision support algorithms, gathering and relating information such as speed, mass, and direction.

Some sensor systems have no transmitter at all and are equipped to measure, for radar-like purposes, signals from the targets themselves. Such systems are often called passive radars, but the terms radiometers or signal intercept systems are generally more appropriate. Some genuine radars may occasionally be operated in passive modes.

Sensors warn against impending collisions, vehicle and infrastructure defects, and emission levels. Sensors alert local drivers of approaching emergency vehicles, activate emergency flashing lights, and activate the pre-emption of traffic signals.

Sensing is to the front, sides, and rear of a vehicle and information is gathered regarding the distance to and relative velocity of adjacent vehicles and other potential collision hazards such as objects, pedestrians, and animals.

Sensed and imaged information and data feed into computer-based decision support algorithms and determine if vehicle control-intervention will be activated to avoid an imminent collision, and if it would be of sufficient force to require deployment of a pre-collision safety restraint system.

Sensors monitor a driver's psychophysiological condition as compared with the driver's baseline performance, feeding into computer-based decision support algorithms which initiate vehicle-shutdown as safety dictates.

Vision enhancement is implemented through in-vehicle and on-person sensors capable of imaging and sensing the outside scene, dynamically overlaying the sensed and imaged scene on the front windshield, and providing information through interactive voice response.

Sensors warn against impending collisions, vehicle and infrastructure defects, and emissions levels. Sensors alert local drivers of approaching emergency vehicles and activate the pre-emption of traffic signals.

B.8. The Seat Sensors

As mentioned above, the seat sensors 54 are connected to and communicate with the processor 40. The seat sensors 54 may be weight-activated sensors and embedded in the driver seat 56, the front passenger seat 58, and rear passenger seat 60. Further as indicated above, the processor 40 collects information over time on seat shifting by the driver to develop a baseline. The baseline data is then compared to actual seat shifting and, if substantial variation exists, the processor 40 may warn the driver or actually take control of vehicle 28 via the remote control mechanism 78. It is noted that abnormal seat shifting or the lack of a shift may indicate an agitated driver, a drunk driver, or a sleeping driver.

B.9. Passive Electronic Tag

Vehicle 28 includes a passive electronic tag 82. The passive electronic tag 82 may or may not be connected to and in communication with the processor 40. The passive electronic tag 82 is readable by the transmitter 50 of the other vehicles 28 even when its respective vehicle 28 and its processor 40 are turned off. The passive electronic tag 82 may emit signals at relatively low power and have its own power source, such as a battery or solar powered power source. The information included and transmitted by the electronic tag 82 may include the identification signal of the vehicle 28. Such an identification signal may include the mass of the vehicle, which may be important to a vehicle 28 about to rear-end a parked vehicle. For example, the computer processor of the vehicle about to rear-end the parked vehicle, may choose to direct the remote control mechanism 78 to turn the vehicle to another parked vehicle having a lesser mass.

Further, it should be noted that information from a vehicle (whether or not such vehicle may be a crash partner) may be retrieved from the passive electronic tag 82 whether such vehicle is being driven or has been parked.

As to the passive electronic tag, U..S. Pat. No. 5,491,468 is hereby incorporated by reference.

B.10. Global Navigation System

Vehicle 28 includes a global positioning satellite navigation system 84. As to the global navigation system, U.S. Pat. Nos. 5,610,815, 5,483,455, 5,390,125, and 5,598,339 are hereby incorporated by reference in their entireties. The global navigation system 84, as well as the electronic tags 32 positioned in and around the traffic complex 10, may determine the position of a vehicle 28 in the traffic complex 10 and the position of a vehicle 28 relative to an intersection.

B.11. Turn Signal Mechanism

Vehicle 28 includes a unique turn signal mechanism 86. The traffic complex 10 includes thorough ways which in turn include lanes, such as lanes 88, 90 as shown in FIG. 29. When a driver intends to change lanes, the driver moves an arm 92, which in turn activates a turn signal light 94 for the vehicles and which also sends a signal to the transmitter 50 to transmit to other vehicles an intent to change lanes. Optionally, when the remote control mechanism 78 has control of the vehicle, the remote control mechanism 78 may turn on the turn signal mechanism 86.

B.12. Engine Sensors

Vehicle 28 further includes engine sensors connected to and in communication with processor 40. Such sensors include an oil pressure sensor 96, oil level sensor 98, engine temperature sensor 100, and an alternator output level sensor 102.

B.13. Wheel Sensors

Vehicle 28 further includes wheel and tire sensors connected to and in communication with processor 40. Such sensors include the rotational sensor 66, a brake pad thickness sensor 104, a brake temperature sensor 106, and a tire pressure sensor 108. As to the brake pad thickness or wear sensor, U.S. Pat. No. 5,520,265 is hereby incorporated by reference in its entirety. As to the brake temperature sensor, U.S. Pat. No. 4,569,600 is hereby incorporated by reference in its entirety. As to the tire pressure sensor, U.S. Pat. No. 5,540,092 is hereby incorporated by reference in its entirety.

B.14 Vehicle Ignition Mechanism

Each of the vehicles 28 further includes the vehicle ignition 67, which may be tied into the vehicle processor 40, vehicle transmitter 50, and vehicle receiver 42 such that tampering with at least one of the vehicle processor 40, vehicle transmitter 50, and vehicle receiver 42 disables the vehicle ignition mechanism 67.

In law enforcement vehicles, the vehicle transmitter 50 may be turned off without disabling the vehicle ignition mechanism 67 whereby law enforcement vehicles may choose not to provide advance warnings of its own approach if such is detrimental to law enforcement.

C. Infrastructure Control Mechanisms and FIGS. 5A and 5B

Figure 5A:
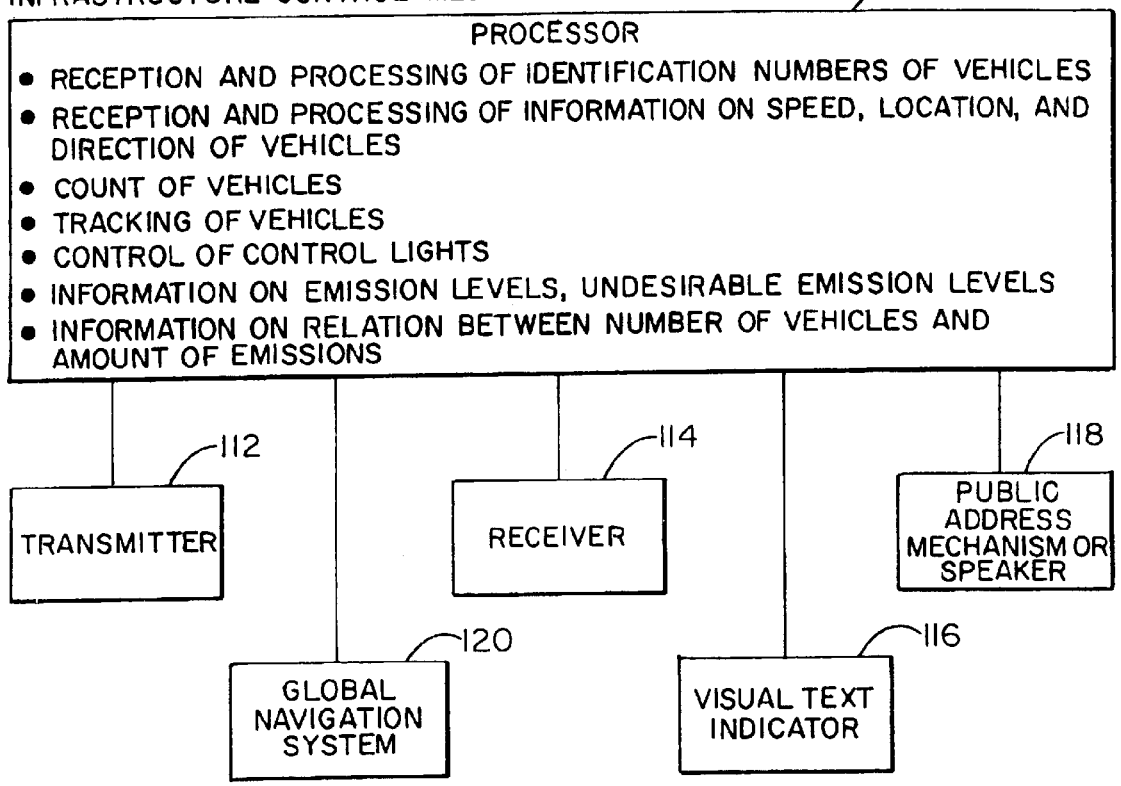
FIG. 5A is a diagrammatic view of the features of the infrastructure control mechanism of FIG. 2.
Figure 5B:
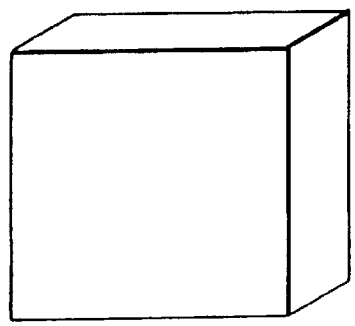
FIG. 5B is a perspective view showing a housing for an infrastructure control mechanism.

As shown in FIG. 5B, the infrastructure control mechanism 30 is preferably a stationary structure located at one or more locations in the traffic complex 10. As shown in FIG. 5A, the infrastructure control mechanism 30 includes a processor 110, transmitter 112, and receiver 114, which may be identical or similar to the processor 40, transmitter 50, and receiver 42 of vehicle 28. The infrastructure control mechanism 30 may further include a visual text indicator 116 and a public address mechanism or speaker 118. The visual text indicator 116 and public address mechanism or speaker 118 may be located in the traffic complex 10 adjacent to or afar from its respective infrastructure control mechanism 30 and adjacent to a through way for providing visual or audible messages to drivers, pedestrians, bicyclists, or the impaired.

The infrastructure control mechanism 30 may further include a global navigation mechanism 120 identical or similar to global navigation system 84. The purpose of the global navigation system 120 in the stationary infrastructure control mechanism 30 is such that its location may be transmitted to vehicles in the vicinity as such vehicle may be without a global navigation system. A vehicle 28 without a global navigation system 84 may tap into and communicate with a nearby infrastructure control mechanism 30 for information, such as to determine the position of the vehicle 28 in the traffic complex 10.

Processor 110 of the infrastructure control mechanism 30 exchanges information with one or more of the vehicles 28. Since each of the vehicles 28 includes a unique identification number or signal, the processor 110 may differentiate among the vehicles, and count and track the vehicles. The traffic complex 10 includes a plurality of control lights 20, and the infrastructure processor 110 may turn on and off the control lights 20 so as to manage traffic flow in response to information received as to its tracking of the vehicles 28, including information it gathered by processing information on vehicle speed, location, and direction of travel.

As indicated above, the traffic complex 10 may include entrances 16 to a thorough way or freeway and control lights 20 adjacent to the thorough way for regulating vehicle flow onto the freeway. The infrastructure processor 110 may manage vehicle flow from the entrances 16 to the freeway by turning on and off the control lights 20 adjacent to the entrances 16.

The infrastructure control mechanism 30 may include information or data relating to undesirable emission levels, and may further include information or data relating the number of vehicles which are likely to produce such undesirable emission levels. In response to the number of vehicles and/or undesirable emission levels, the infrastructure control mechanism 30 may manage the control lights 20 in relation to the data on undesirable emission levels. For example, one or more infrastructure control mechanisms 30 may direct vehicles away from or around an area having an excessive number of vehicles and/or undesirable emission levels.

The traffic complex 10 may include a plurality of visual text indicators 10 controlled by one or more infrastructure control mechanisms 30. One or more of the infrastructure control mechanisms 30 may display messages on one or more visual text indicators in response to tracking of the vehicles. For example, if vehicle flow is heavy in one portion of the traffic complex 10, messages may be displayed outside or on the perimeter of such a portion to warn drivers, pedestrians, and bicyclists to perhaps avoid such a portion of the traffic complex.

The infrastructure control mechanism 30 may further display a message on the visual text indicator 74 of a vehicle 28 in response to tracking of the vehicles. For example, the mechanism 30 may warn the driver of such vehicle to stay away from heavy traffic flow.

As indicated above, traffic complex 10 includes a plurality of public address mechanisms 118 controlled by one or more infrastructure control mechanisms 30. The infrastructure control mechanism 30 may broadcast a message on at least one of the public address mechanisms in response to tracking of the vehicles. For example, the infrastructure control mechanism 30 may warn pedestrians and bicyclists to stay away from heavy traffic flow.

Further, since each of the vehicles 28 preferably includes a speaker 72 connected to the processor 40 of its vehicle 28, the infrastructure control mechanism 30 may send a message for broadcast on the speaker 72 in response to its tracking of the vehicles 28. For example, the infrastructure control mechanism 30 may announce heavy traffic flow is present in the direction the vehicle is headed.

The processor 110 of the infrastructure control mechanism 30 may locate the position of a vehicle in response to an input of the identification number of the vehicle therein.

The processor 110 of the infrastructure control mechanism 30, which is transmitting, receiving and processing information from the vehicles on vehicle speed location and direction, may activate one or more of the remote control mechanisms 78 of certain vehicles upon determining that a collision is likely between such vehicles.

It should be noted that each of the vehicles 28 includes one or more in-vehicle sensors in communication with the vehicle processor 40 and thereby in communication with the infrastructure control mechanism 30. Such is advantageous. For example, with the in-vehicle sensor sensing via the seat sensors 54 the location of passengers in the vehicle, the infrastructure control mechanism 30 may take into account the number and location of the passengers when activating the remote control mechanisms 78 of such vehicles, and remotely drive such vehicles in a direction to minimize injury to passengers.

The processor 110 of the infrastructure control mechanism 30 may determine the likelihood of a collision, based on receiving, comparing, and processing information on at least a pair of vehicles. The processor 10 may then activate the warning devices 68 of vehicles determined to likely collide.

Further, the processor 110 of the infrastructure control mechanism 30 may include information on road position and width, and provide such information to a vehicle on the position and width of the road.

D. Emergency Flashing Light Mechanism and FIGS. 6A and 6B

In addition to control lights 20 mounted at one or more intersection, emergency light flashing mechanisms 22 may be mounted at one or more intersections. Preferably, there are two sets of lights at each of the intersections requiring light regulation, with one set of lights being the control lights 20 and with the other set of lights being the emergency flashing light mechanisms 22. Or, if desired, the emergency flashing light mechanism 22 may be a mechanism in each of the control lights 20 which controls such lights 20 so as to, for example, flash the lights 20.

Figure 6A:
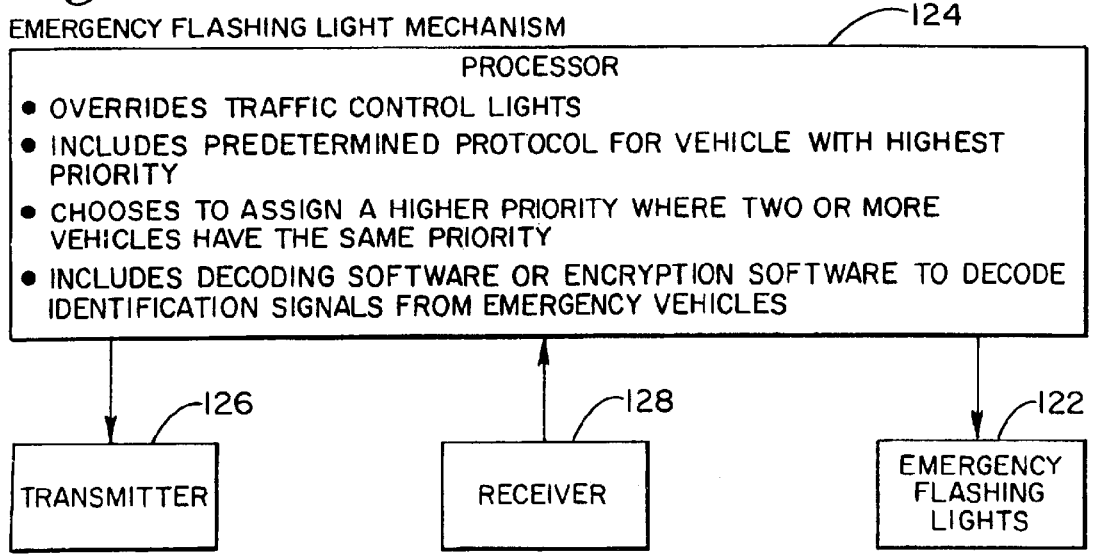
FIG. 6A is a diagrammatic view of the features of the emergency flashing light mechanism of FIG. 2.
Figure 6B:
FIG. 6B is a front view of the emergency flashing light mechanism of FIG. 6B.

A preferred structure for the emergency flashing light mechanism is shown in FIG. 6B. As shown in FIG. 6A, each of the emergency flashing light mechanisms 22 includes one or more emergency flashing lights 122, a processor 124 identical or similar to vehicle processor 40, a transmitter 126 identical or similar to vehicle transmitter 50, and a receiver 128 identical or similar to vehicle receiver 42. The emergency light flashing mechanisms 22 may exchange information with the vehicles 28 via their respective transmitters and receivers, and the emergency flashing light mechanisms 22 may process such information.

The traffic complex may include emergency vehicles, which may control the emergency light mechanisms 22 whereby vehicles such as ambulances may move smoothly through the traffic complex 10.

The traffic complex 10 may further include right-of-way vehicles such as trains 25 running on tracks 26. Such right-of-way vehicles may control the emergency lights 122 of the emergency light mechanisms 22 so that vehicles such as trains 25 may move smoothly through the traffic complex.

The traffic complex 10 includes the control lights or local traffic signals 20, which may be connected to and in communication with the emergency flashing light mechanisms 22 such that the local traffic signals 20 may be controlled by the emergency flashing light mechanisms 22.

Each of the processors 110 of the emergency light flashing mechanisms 22 includes a predetermined protocol, and each of the vehicles includes an identification number with a priority such that the emergency light flashing mechanisms 22 may be operated in response to the predetermined protocol and such that the protocol gives a go-ahead through an intersection to the vehicle with the highest priority when more than one vehicle approaches an intersection.

Further, the processor 124 of the emergency light flashing mechanism 22 may include decoding software or encryption software to decode identification signals from emergency vehicles so as to minimize unauthorized control of the emergency light flashing mechanisms.

Infrastructure safety and information systems include and control emergency flashing lights (much like the flashing lights on an emergency vehicle) which are activated by a broadcasted signal from an approaching emergency vehicle and/or train. The activating signal can also be transmitted from the infrastructure and other sources.

Local traffic signals, controlled by the infrastructure safety and information systems, are pre-empted, depending on the kind of emergency vehicle(s) and/or train(s), its priority(s), and the alert messages.

The emergency flashing lights system includes a predetermined protocol, with each of the right-of-way vehicles having a priority code, and with the emergency flashing lights systems operating in response to predetermined protocol such that the protocol gives a go-ahead through an intersection to the right-of-way vehicles in the order of highest priority first when more than one right-of-way vehicle is approaching an intersection.

E. Control Light Mechanism and FIGS. 7A and 7B

Figure 7A:
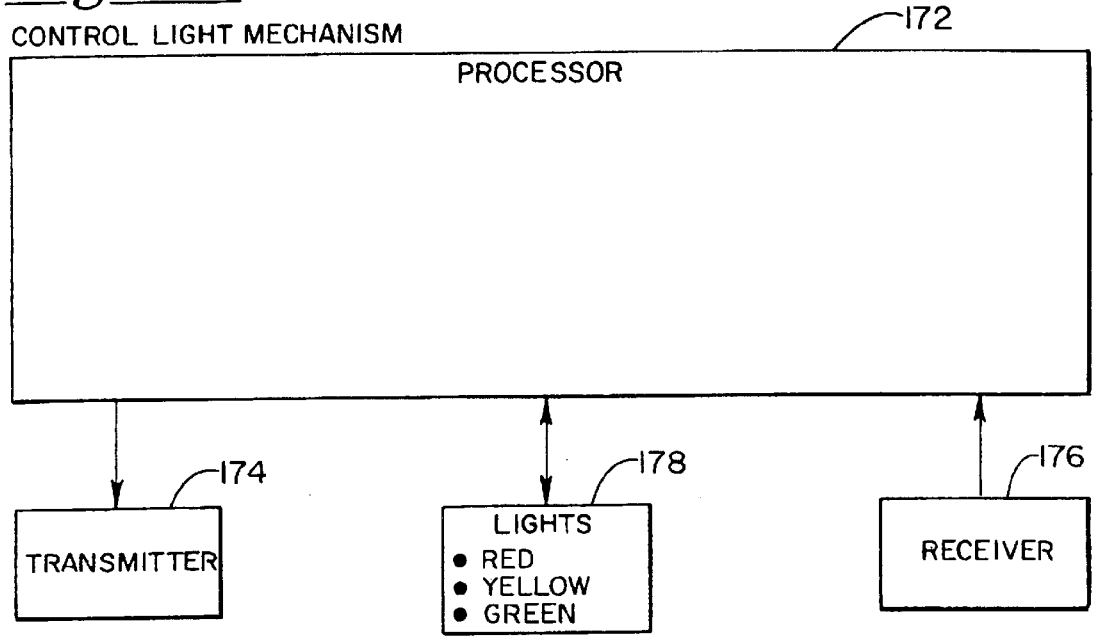
FIG. 7A is a diagrammatic view of the features of the control light mechanism of FIG. 2.
Figure 7B:
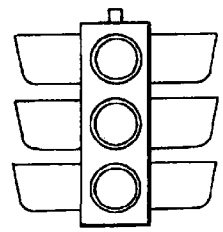
FIG. 7B is a front view of the control light mechanism of FIG. 7A.

As shown in FIGS. 7A and 7B, the control light mechanism 20 may include a processor 172 identical or similar to vehicle processor 40, a transmitter 174 identical or similar to vehicle transmitter 50, a receiver 176 identical or similar to vehicle receiver 42. The control light mechanism 20 further includes lights 178 such as green, yellow, and red lights. The control light mechanism 20 may further continuously transmit information such as the color of the light being shown and the time interval for such.

F. Video/Audio Surveillance and Alarm Equipment and FIGS. 8A and 8B

Figure 8A:
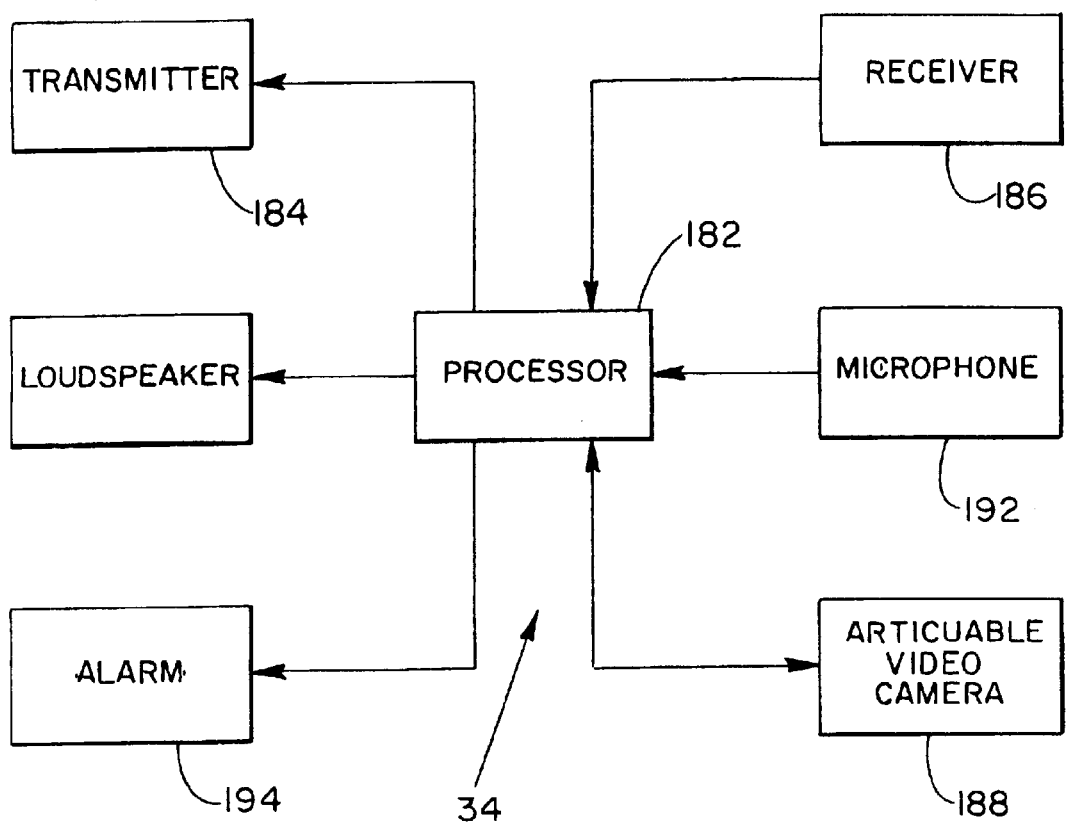
FIG. 8A is a diagrammatic view of the features of the video/audio surveillance and alarm equipment of FIG. 2.
Figure 8B:
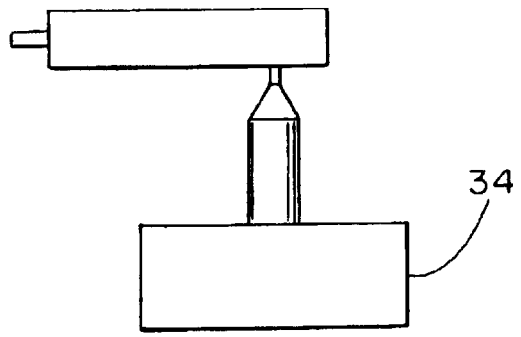
FIG. 8B is a side view of the video/audio surveillance and alarm equipment of FIG. 8A.

As shown in FIGS. 8A and 8B, the video/audio surveillance and alarm equipment 34 includes a processor 182 identical or similar to the vehicle processor 40, a transmitter 184 identical or similar to the vehicle transmitter 50, and a receiver 186 identical or similar to vehicle receiver 42, articulable camera or video mechanism 188, a loudspeaker or public address mechanism 190, a microphone 192, and an alarm 194. The transmitter 184, receiver 186, video mechanism 188, loudspeaker 190, microphone 192 and alarm 194 are connected to and in communication with the processor 182.

G. Emission Sensor Mechanism and FIGS. 9A and 9B

Figure 9A:
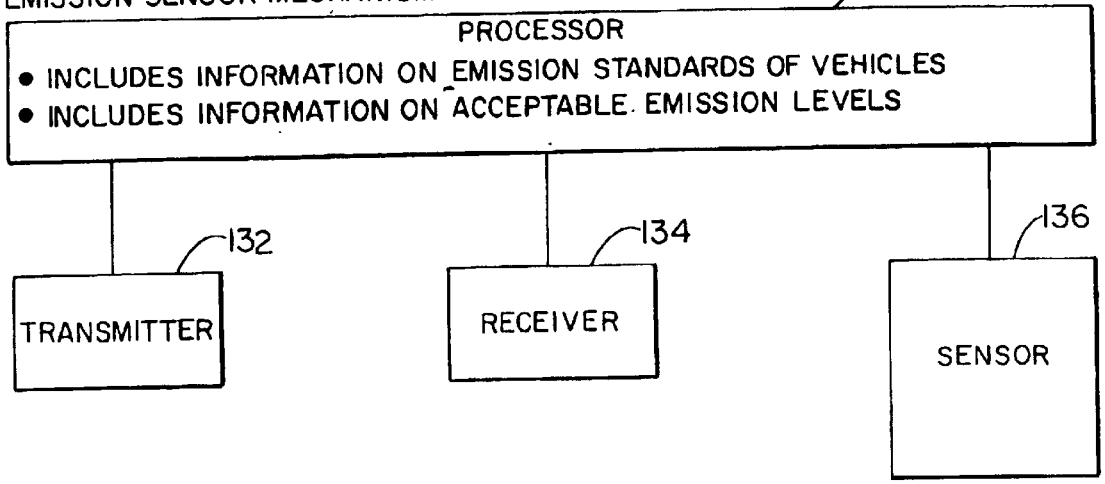
FIG. 9A is a diagrammatic view of the features of the emission sensor mechanisms of FIG. 2.
Figure 9B:
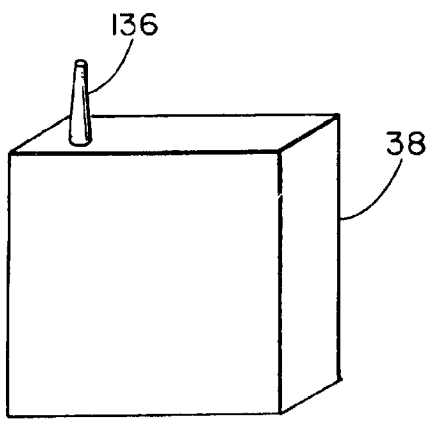
FIG. 9B is a perspective view of a housing for the emission sensor mechanism of FIG. 9B.

The traffic complex 10 further includes one or more emission sensor mechanisms 38. The physical structure of such a mechanism is shown in FIG. 9B. As shown in FIG. 9A, each of the emission sensor mechanisms 38 includes a processor 130 identical or similar to vehicle processor 40, a transmitter 132 identical or similar to vehicle transmitter 50, and a receiver 134 identical or similar to vehicle receiver 42. Each of the emission sensor mechanisms 38 further includes an emission sensor 136. As to the emission sensor 136, U.S. Pat. Nos. 5,371,367 and 5,319,199 are hereby incorporated by reference in their entireties.

The emission sensor mechanism 136 may sense the type and level of emissions, and may even associate such with a particular vehicle. With the emission sensor mechanism 38 including processor 130, transmitter 132, and receiver 134, the mechanism 38 may exchange information with each of the vehicles, each of which is assigned and transmits an identification number such that the type of vehicle is identified to the processor 130 of the emission sensor mechanism 38. Since the processor 130 of the emission sensor mechanism 38 may include data or information on emission standards of vehicles, the processor 130 may compare the emission sensed from a passing vehicle with its data on emission standards and generate a report therefrom or in response thereto send a message to appropriate authorities.

It should be noted that the local traffic or control lights 20 may be controlled or preempted by the emission sensor mechanisms, with the processor of the emission sensor mechanism 38 which may include data on acceptable emission levels. The processor 130 of the emission sensor mechanism 38 may initiate the step of preempting when it senses emissions above an acceptable emissions level.

Figure 10A:
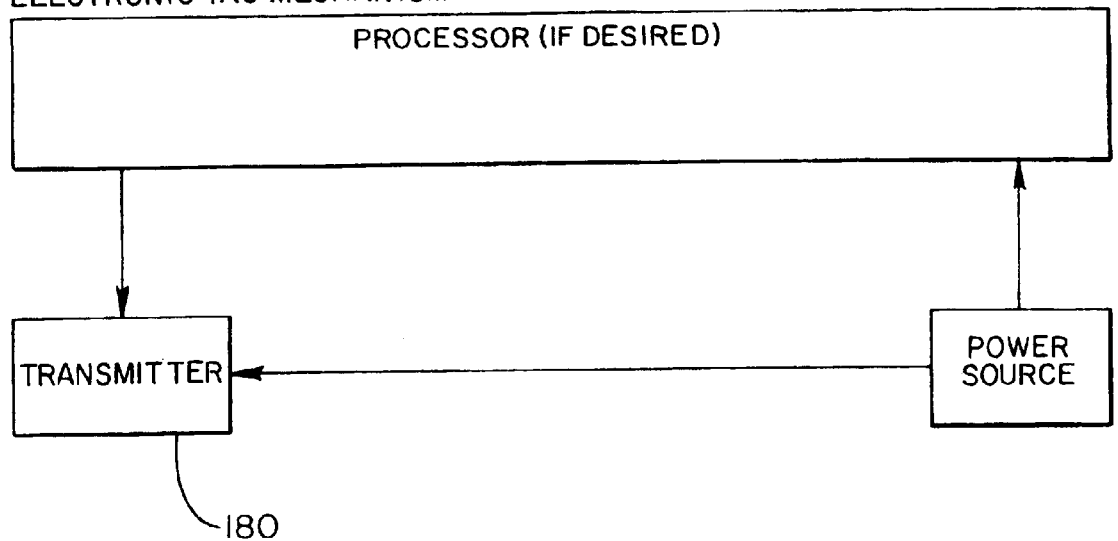
FIG. 10A is a diagrammatic view of the features of the electronic tag mechanism of FIG. 2.
Figure 10B:
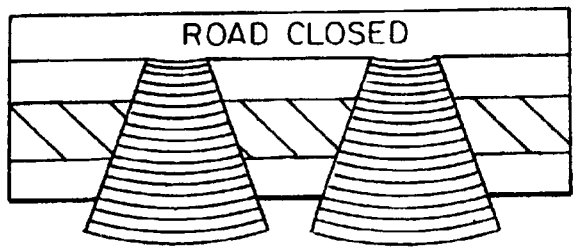
FIG. 10B is a front view of a road block structure and shows diagramatically the electronic tag embodied in such road block structure.

H. Electronic Tag Mechanism and FIGS. 10A and 10B

As shown in FIG. 10, the electronic tag 32 may include a transmitter 180 for communicating information on the object to which it is engaged. For example, the traffic complex 10 may include a plurality of stationary objects. Preferably, each or a vast majority of the stationary objects adjacent to a thorough fare includes the electronic tag 32 having information about such stationary object. The information is then transmitted to approaching vehicles 28 by the transmitter 180. As to such an electronic tag 32, U.S. Pat. No. 5,491,468 is hereby incorporated by reference in its entirety. As to the transmitter 180, such may be identical or similar to vehicle transmitter 50. If desired, the electronic tag 32 may include a processor or integrated circuit for storing the information about the stationary object. The electronic tag 32 further includes a power source such as a battery or a solar powered power source.

Further it should be noted that it is preferred that each object, such as each vehicle, moving through the traffic complex 10 have its own electronic tag.

I. Portable Safety Mechanism and FIGS. 11A, 11B, 12A–C, 13, 14A, 14B, 15A, 15B, 16A and 16B The traffic complex 10 includes the portable safety mechanism 36, shown generally in FIGS. 11A and 11B. The portable safety mechanism 36 may be housed in a cane 138 as shown in FIG. 16A, a walking stick 140 as shown in FIGS. 12A–C and FIG. 16B, or a belt-carried housing 142 as shown in FIG. 11B. In each of such embodiments, the portable safety mechanism 36 includes a processor 144 identical or similar to vehicle processor 40, a transmitter 146 identical or similar to vehicle transmitter 50, a receiver 148 identical or similar to vehicle receiver 42, and an outside image sensor or scanner 150 similar or identical to one of the embodiments of vehicle scanner 80, a warning device 152 similar or identical to one of the vehicle warning devices 68 (preferably the audible warning device 72 or warning light 70). The scanner 150 may, for example, sense the shape of a traffic signal or the color of a traffic signal.

Figure 11A:
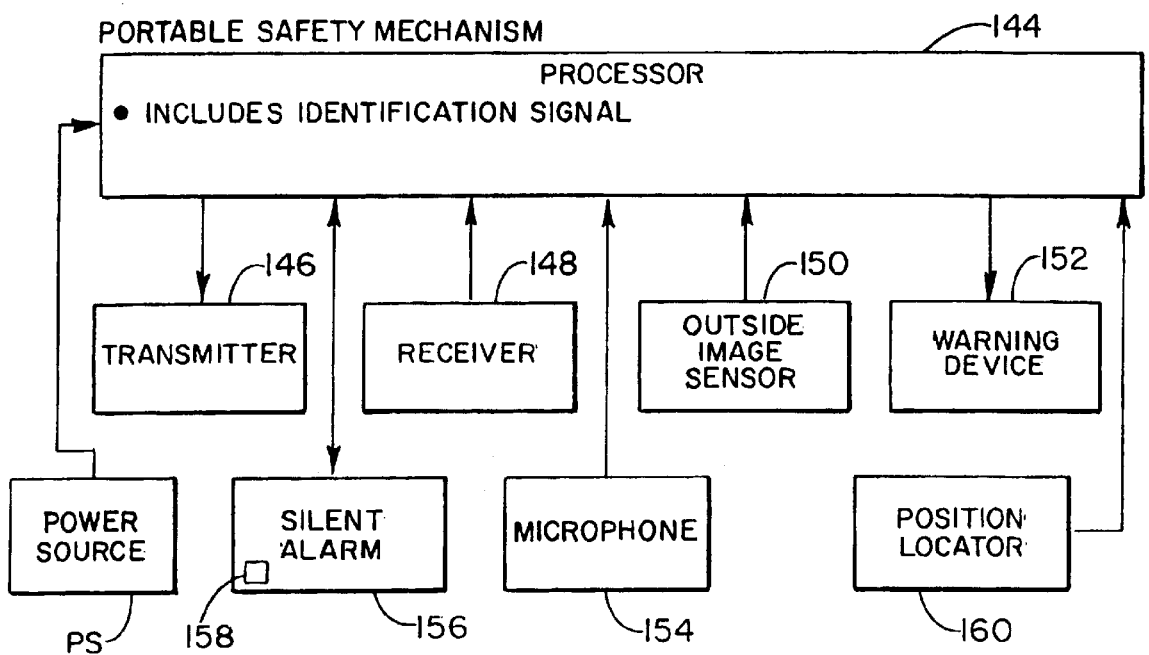
FIG. 11A is a diagrammatic view of the features of the portable safety mechanism of FIG. 2.
Figure 11B:
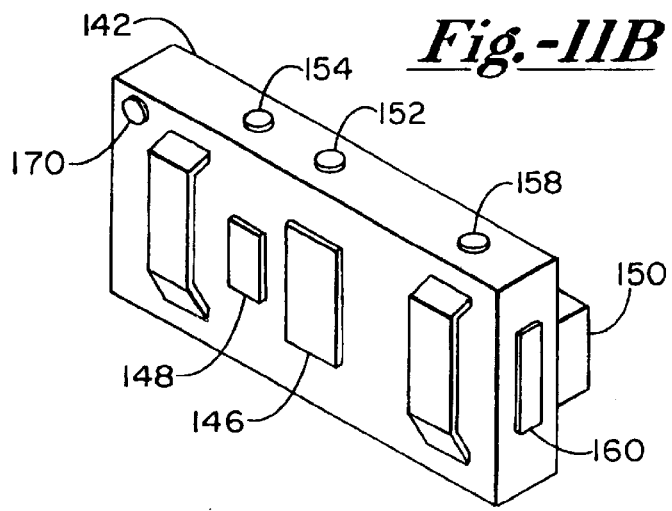
FIG. 11B is an elevation, partially schematic view of one embodiment of the portable safety mechanism of FIG. 11A.

As shown in FIG. 11A, the portable safety mechanism or intelligent walking stick 144 may have a power source PS, such as a battery, electrically connected to the processor 144 and thus also electrically connected to other components of the mechanism or stick 144. The lines connecting the various components of FIG. 11A may be representative of lines of communication, such as electrical lead lines.

The portable safety mechanism 144 may further include a microphone 154 connected to and in communication with the processor 144 and transmitter 146 and a silent alarm 156 connected to and in communication with the processor 144 and transmitter 146. The silent alarm 156 may include a button 158 which, when pushed, sends a 911 emergency call for help via the transmitter 146.

The portable safety mechanism 144 may further include a position locator 160 which may be a compact global navigation system or simply software in the processor 144 which communicates via the transmitter 146 with one or more electronic tags 32 so as to determine the position of the person carrying the portable safety mechanism 36.

The portable safety mechanism 36 further includes, where the portable safety mechanism 36 is the cane 138 or the walking stick 140, a means 160 for propelling such in each of the azimuth directions, with the propelling means 160 being in communication with the processor 144. The propelling means 160 may include a pair of positively driven wheels 162 on a first axle 164. The axle 164 is pivotable about shaft 166 driven by a small motor 168. Or the propelling means may be a positively driven ball and socket mechanism 169 driven by a motor 169a. However, preferably, at its distal end, the cane 138 and walking sticks 140 and 300 simply have a roller, such as a wheel or a roller ball.

The processor 144 of the portable safety mechanism 36 may include information on characteristics of the pedestrian or person carrying the portable safety mechanism.

It should be noted that the traffic complex 10 includes a plurality of control light mechanisms 20 and that each of the control light mechanisms 20 includes a processor and a transmitter and receiver in communication with the processor, as discussed below, such that the portable safety mechanism 36 may communicate with at least one of the control lights mechanisms 20. Further, the portable safety mechanism 36 may communicate with one or more of the vehicles 28.

Since the portable safety mechanism 36 includes a transmitter 146, a silent alarm 156 triggerable by the pedestrian and in communication with the transmitter 146, and a microphone 154 in communication with the transmitter 146, a pedestrian may be warned of dangers and be monitored remotely.

As noted above, the portable safety device 36 includes a position locator 160 in communication with the transmitter 146. The position locator may be a global positioning system. Further, the processor 144 of the portable safety mechanism 36 includes an identification signal for being transmitted for identifying the pedestrian. For further safety, the traffic complex 10 includes video and audio surveillance equipment 34, described below, which may be in communication with the transmitter 146 of the portable safety mechanism 36.

It should further be noted that the traffic complex 10 includes a plurality of alarms as part of the video and audio surveillance equipment 34. The alarms may be in communication with the portable safety mechanism 36 and one or more of the alarms may be activated by the portable safety mechanism 36 such as depressing a button 170 on one of the cane 138, walking stick 140, or portable safety mechanism 142.

Intelligent walking sticks and on-person sensors and scanners, including video and digital image processing enhance the safety of the visually and hearing impaired and increase safety and security for the general public. Sensed/scanned images produce a visual display (or audible sound) of the image through a display that overlays the image on the glasses, goggles, shield or other device worn or carried by the impaired person.

For example, a walking stick and/or on-person sensors capable of imaging and/or sensing the surrounding scene, and further passive electronic tags or infrastructure-based components around obstructions and hazards warn the impaired person by transmitting warnings and instructions. Algorithms initiate or advise appropriate actions depending on the characteristics of the impaired.

For example, an intelligent walking stick and/or on-person sensors capable of imaging and/or sensing the surrounding scene, and further video and digital image processing systems recognize traffic signals and advise when it is safe for the impaired person (child, senior, anyone who carries or wears on-person sensors) to proceed, and when he/she begins to cross a street, surrounding vehicles are warned (advised) of his/her presence and/or controlled to avoid hitting the individual(s).

With more particularity as to the embodiment of the portable safety mechanism shown in FIG. 12B, the intelligent walking stick 300 includes a handle at a proximal end 302 and a ball and socket mechanism 304 at the distal end of the stick 300. The ball and socket mechanism 304 is positively driven by such as by mechanism 169a so as to steer the impaired person a desired direction.

The stick 300 includes at least three main sections, a proximal section 306, a middle section 308, and a distal section 310. Proximal and middle sections 306 and 308 are preferably hollow such that middle section 308 is telescopically receivable in proximal section 306 and such that distal section 310 is telescopically receivable in middle section 308. Accordingly, in each of the proximal and middle sections 306 and 308, the components are fixed on or in the cylindrical housing of the proximal and middle sections 306 and 308.

Proximal cylindrical housing section 306 includes, the handle 302, a battery or power source 312, a microphone 314, an oscillator 316, a modulator 318, a transmitter 320, and an antenna 322.

Middle cylindrical housing section 308 includes a duplexer 324, a receiver 326, a processor 328, a warning device 330 such as a speaker or light, and a global positioning system 332. Such components of middle section 308 may be electrically connected via electrical wires to any of the components of proximal section 306.

Distal cylindrical housing section 310 includes a portion 334 having circuitry for automated vehicle control intervention such as taking control of a car or taking control of a processor. Distal section 310 further includes a portion 336 for mounting any of the sensors or scanners referred to above with respect to the vehicle. Portion 338 includes circuitry and other equipment such as video lens or video camera for video and digital image processing. Portion 340 includes an antenna. Portion 342 includes circuitry and other equipment necessary for interactive voice response.

The oscillator 316, modulator 318, transmitter 320, antenna 322, duplexer 324, receiver 326 and processor 328 form a sensor for the intelligent walking stick 300 such as a radar sensor.

FIG. 12A indicates that the video and image processing may overlay an image onto the lens of glasses. The image overlaid may be that of the proximity of the person carrying the walking stick. Such an image may be captured by a lens in portion 338 and such image is then transmitted by the transmitter to a receiver in the glasses. Or such an image could be transmitted by optical wires running from the stick 300, up the arm and shoulder of the person and to his or her neck where such wire or wires is connected to the glasses and the lens of the glasses where such image is overlaid on the glasses.

The person shown in FIG. 12A may further have a microphone so that the person can interact with the circuitry mounted in the interactive voice response portion 342 without speaking into the end of the walking stick 300. The person may question "How far away is the closest moving car?" If the interactive voice response is programmed for such question, it will voice a response after gathering information from other portions of the walking stick 300 such as a sensor.

It should be noted that the walking stick 300 may also have a silent alarm, such as mounted in section 323.

FIG. 13 shows that any of the portable safety mechanisms or intelligent walking stick may communicate with and control the emergency flashing lights 22, may sense the surroundings via a sensor mechanism 80 such as radar, may have and/or consult a global positioning system 332, may communicate with and control one or more vehicles 28, may issue warnings, alerts, and instructions to the person carrying the walking stick 300 or to a driver of one or more vehicles 28, and/or may communicate with and/or control other infrastructure control mechanisms 30. FIG. 13 also shows via communication lines that each of such components may communicate directly with each of the other components.

Figure 14A:
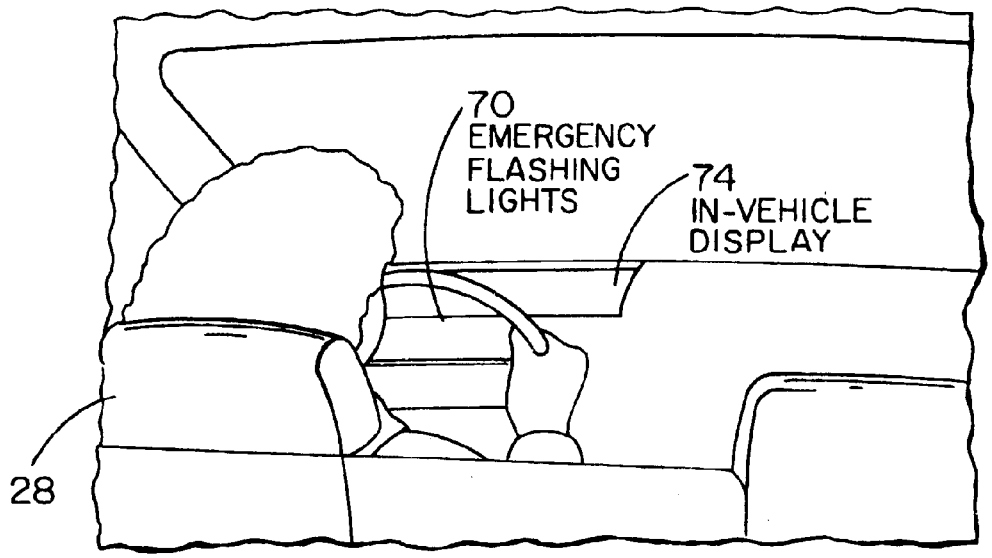
FIG. 14A shows the inside of a vehicle having an in-vehicle display and emergency flashing lights.
Figure 14B:
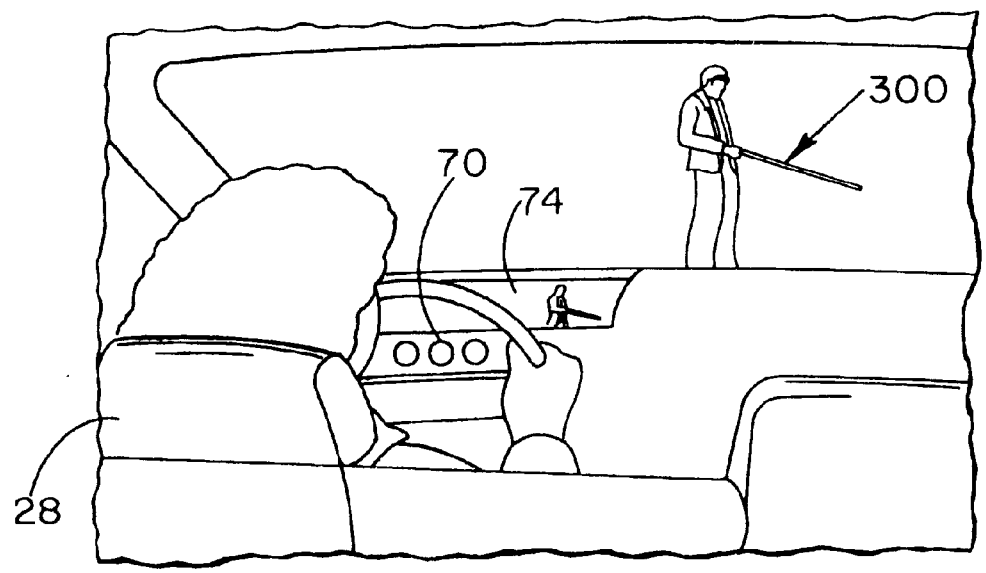
FIG. 14B shows the inside of the vehicle of FIG. 14A where the vehicle is in close proximity to a person carrying the intelligent walking stick of FIG. 12B and indicates the emergency flashing lights activated and a picture of the person on the in-vehicle display.

FIGS. 14A and 14B show that the in-vehicle display 74 may produce an image of a person carrying the walking stick and that warning lights 70 may flash when the vehicle 28 and person carrying the walking stick 300 are in relative close proximity.

Figure 15A:
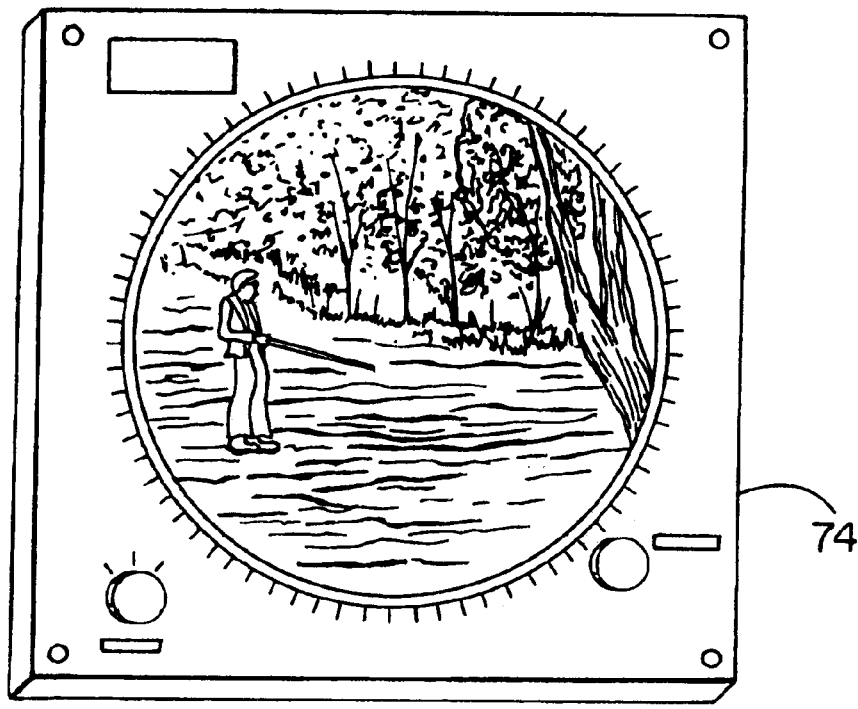
FIG. 15A shows diagramatically a radar instrument indicating the presence of a person carrying the intelligent walking stick of FIG. 12B.
Figure 16A:
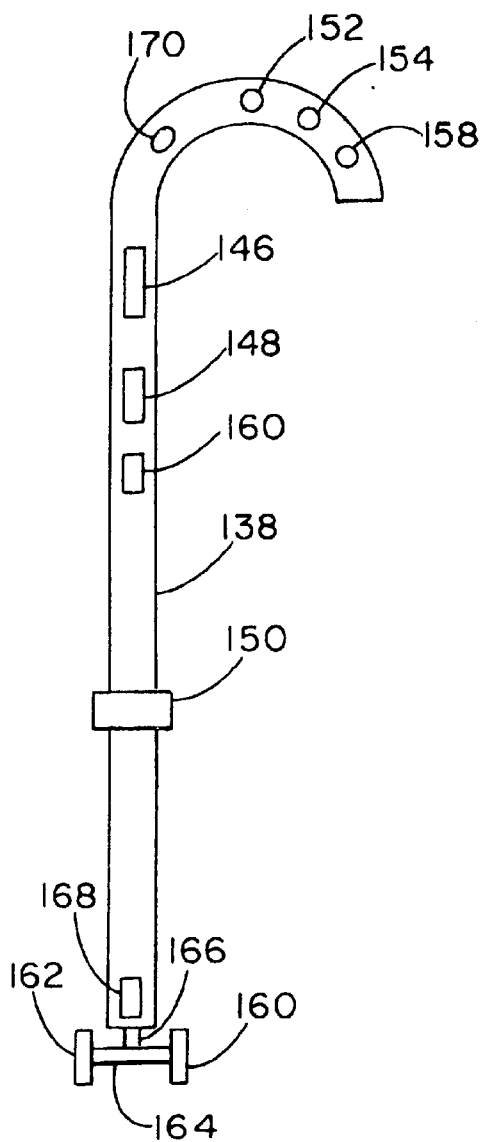
FIG. 16A is an elevation, partially schematic view of still another embodiment of the portable safety mechanism of FIG. 11B.
Figure 16B:
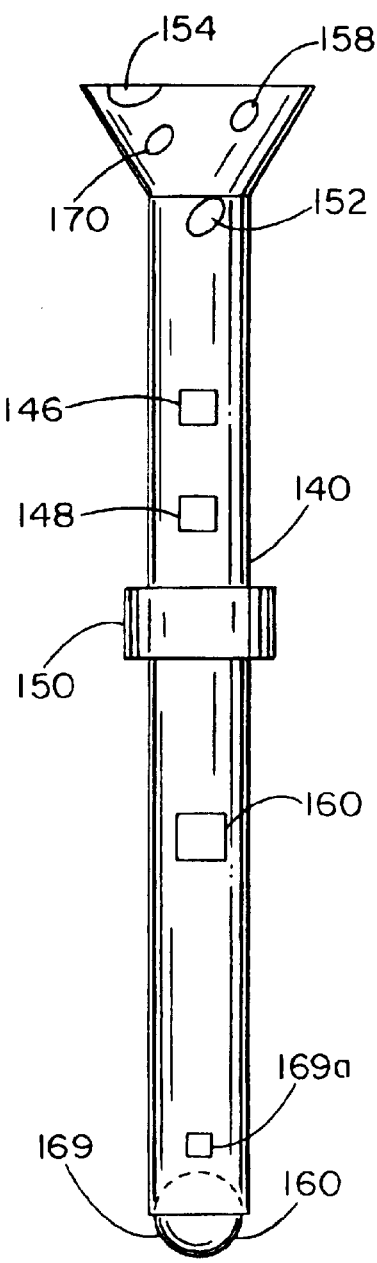
FIG. 16B is an elevation, partially schematic view of yet another embodiment of the portable safety mechanism of FIG. 11B.

FIG. 15A shows that the scanner or outside image sensor 80 may pick up the image of a person, such as a person carrying the walking stick 300, and display such an image on the in-vehicle display.

Figure 15B:
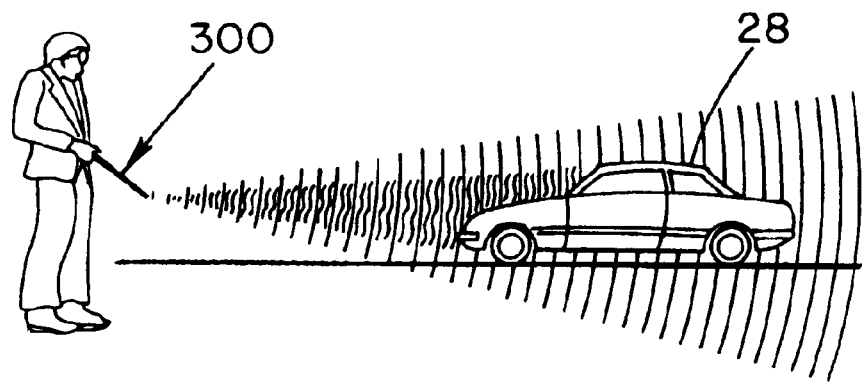
FIG. 15B shows the intelligent walking stick of FIG. 12B sensing the presence of a vehicle.

FIG. 15B shows that the scanner or sensor 336 of the walking stick 300 may sense the approach of a vehicle 28. Hence it can be appreciated that such scanner is located preferably on the distal end 310 of the stick 300 so as to direct the scanner in the direction of an object in question.

Figure 17A:
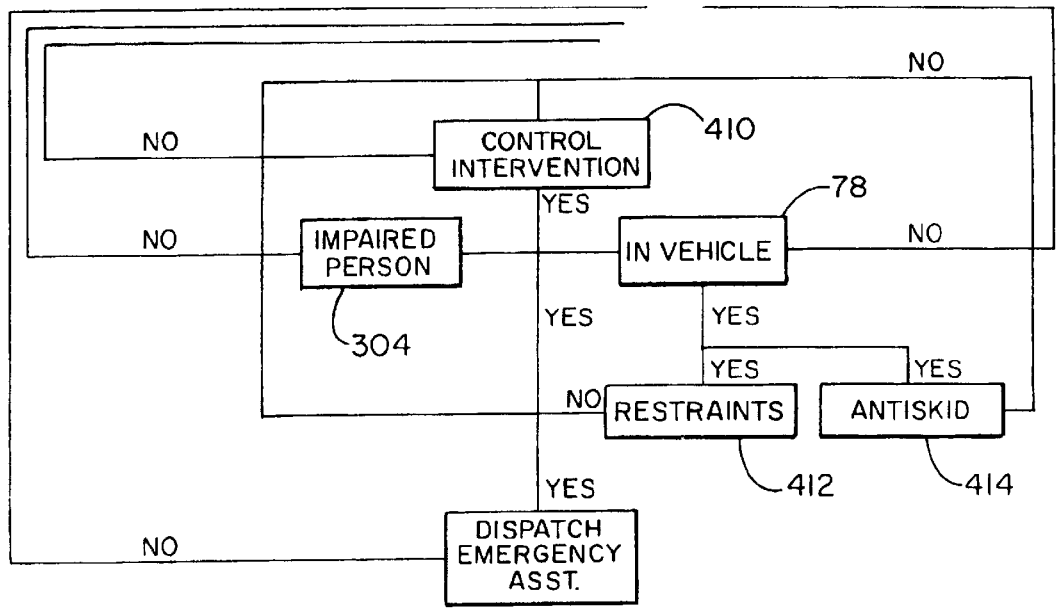
FIG. 17A shows a flow chart for an anti-skid system.
Figure 17B:
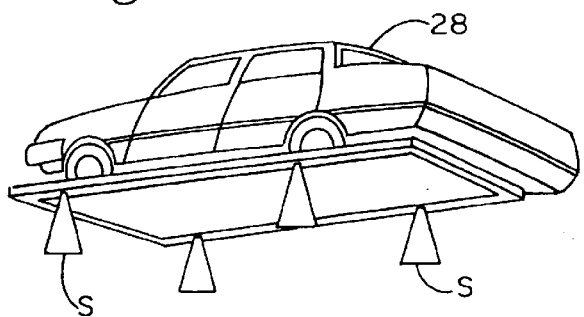
FIG. 17B shows an anti-skid system depositing sand or other anti-skid particles in front of each of the wheels of a car.
Figure 19A:
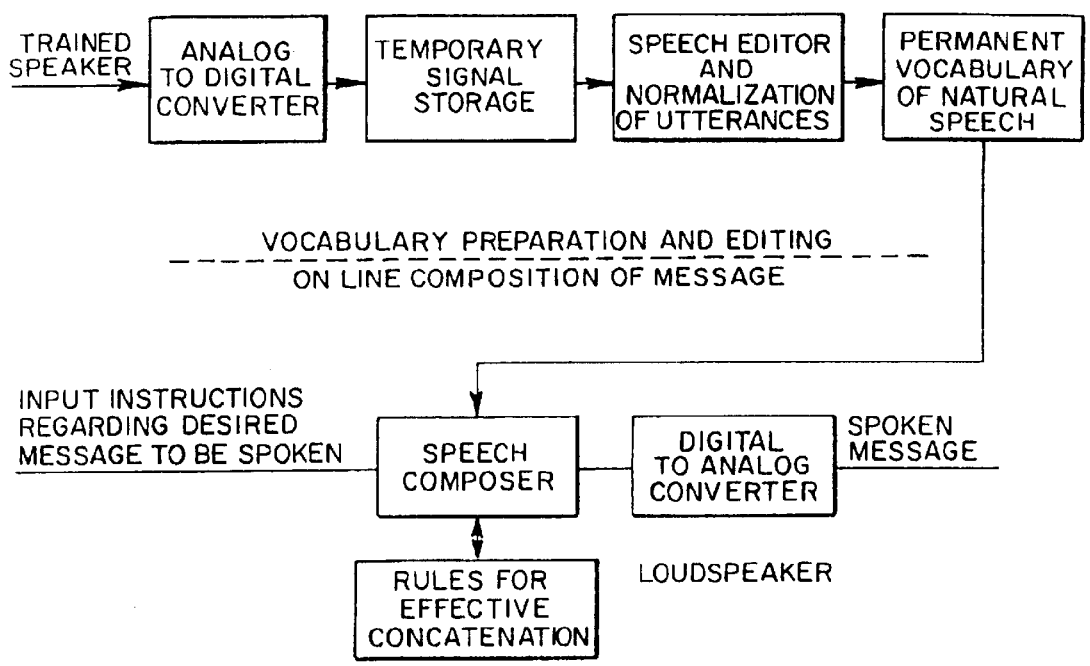
FIG. 19A is a prior art flow chart for a voice response system which is based upon concatenation of words spoken by a human.
Figure 19B:
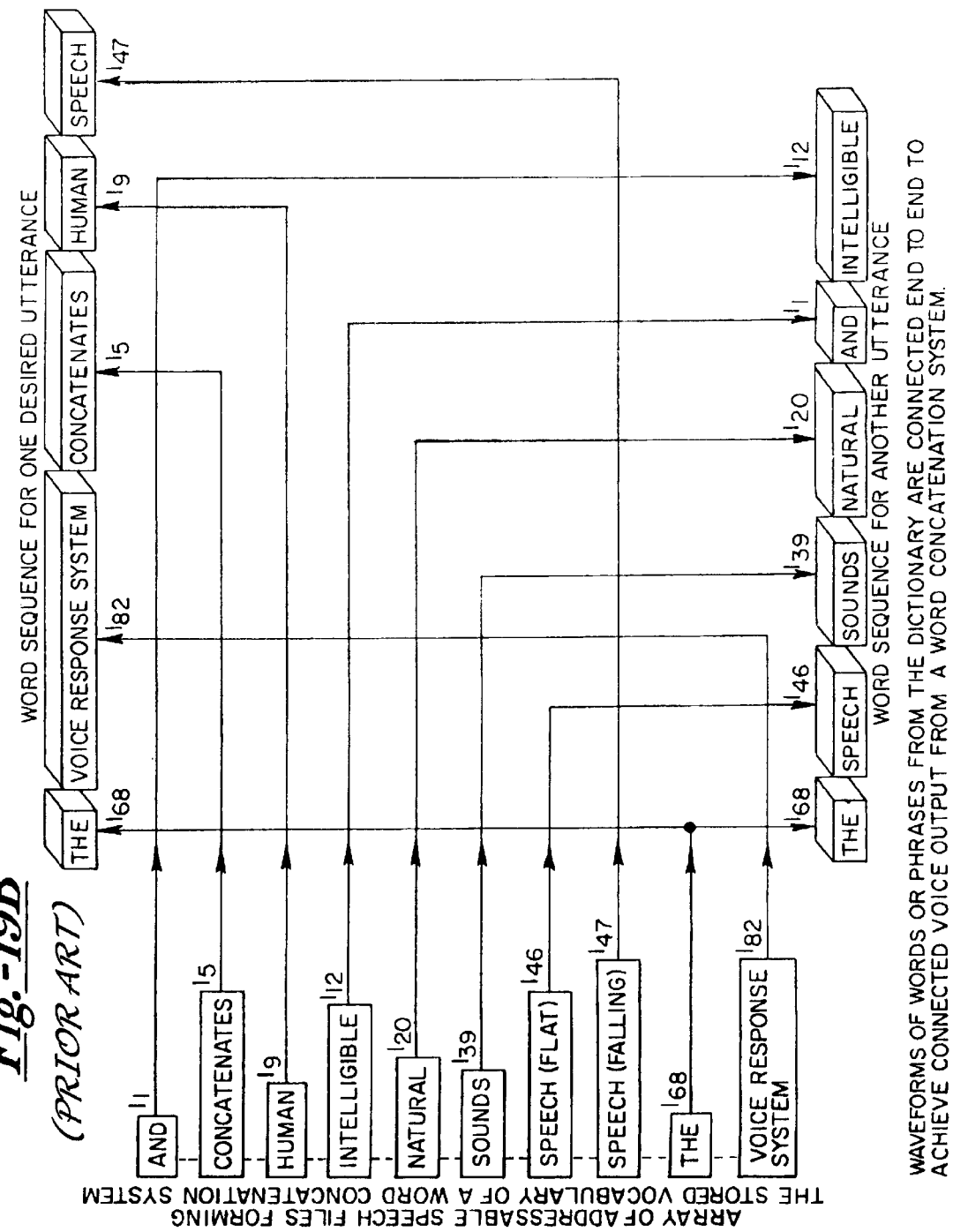
FIG. 19B is a prior art flow chart for waveforms of words or phrases from the dictionary which are connected end to end to achieve connected voice output from a word concatenation system.
Figure 20A:
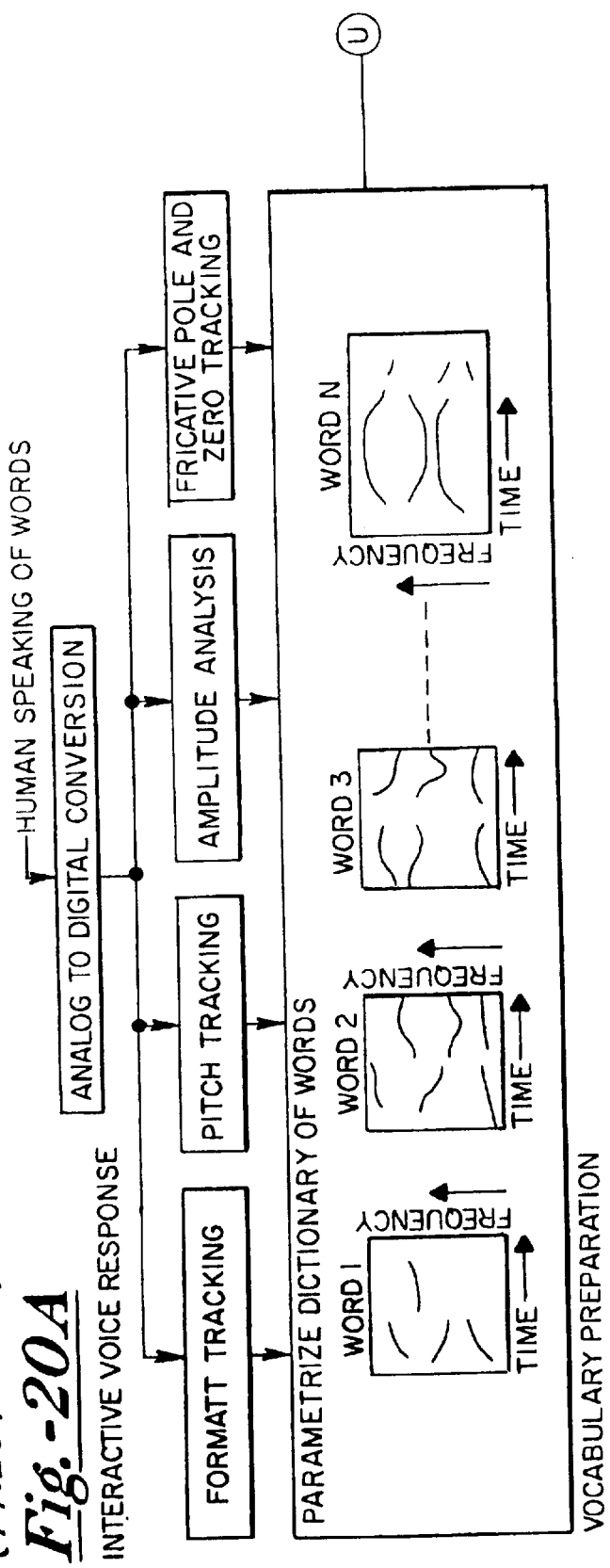
Figure 20C:
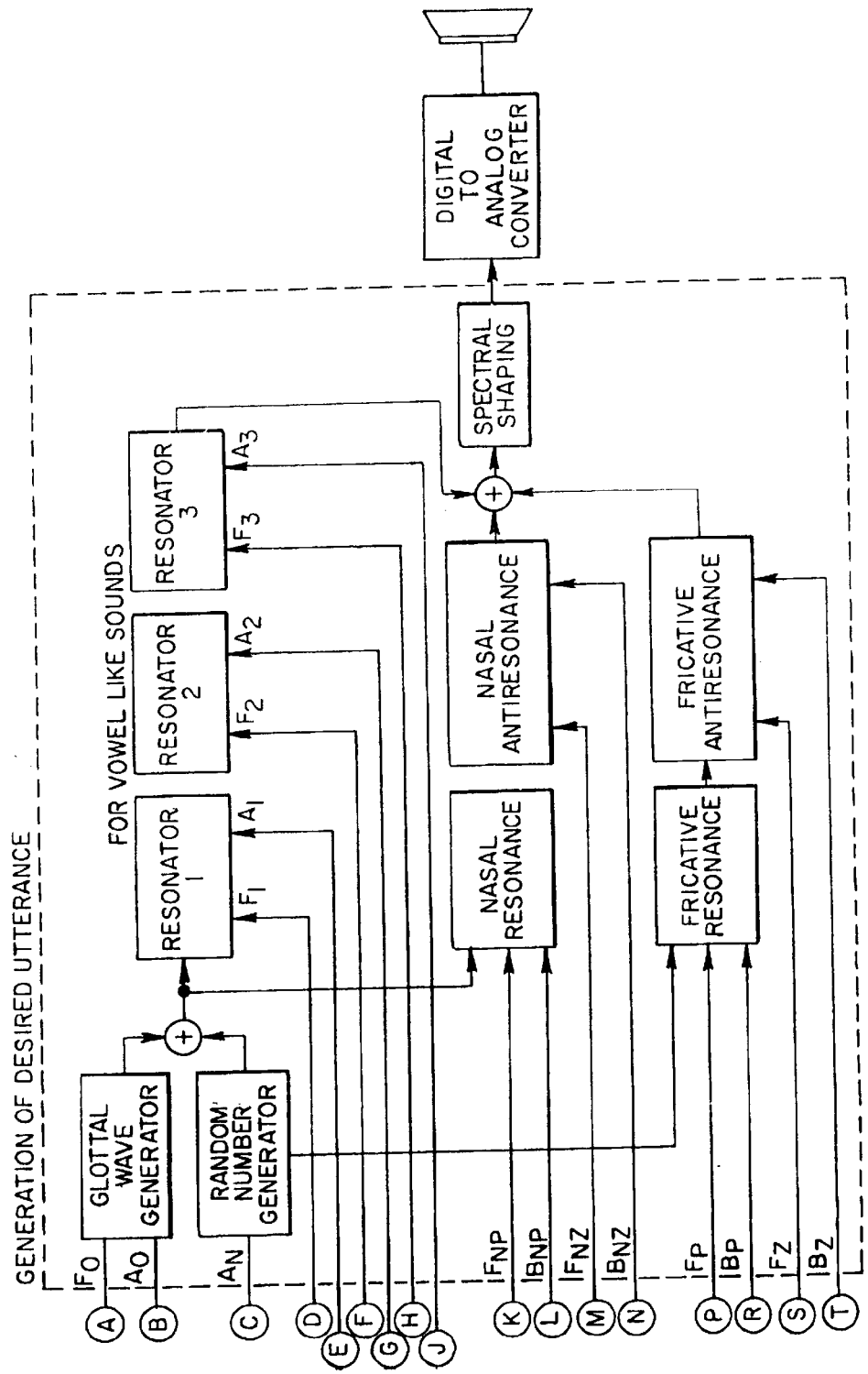
Figure 21A:
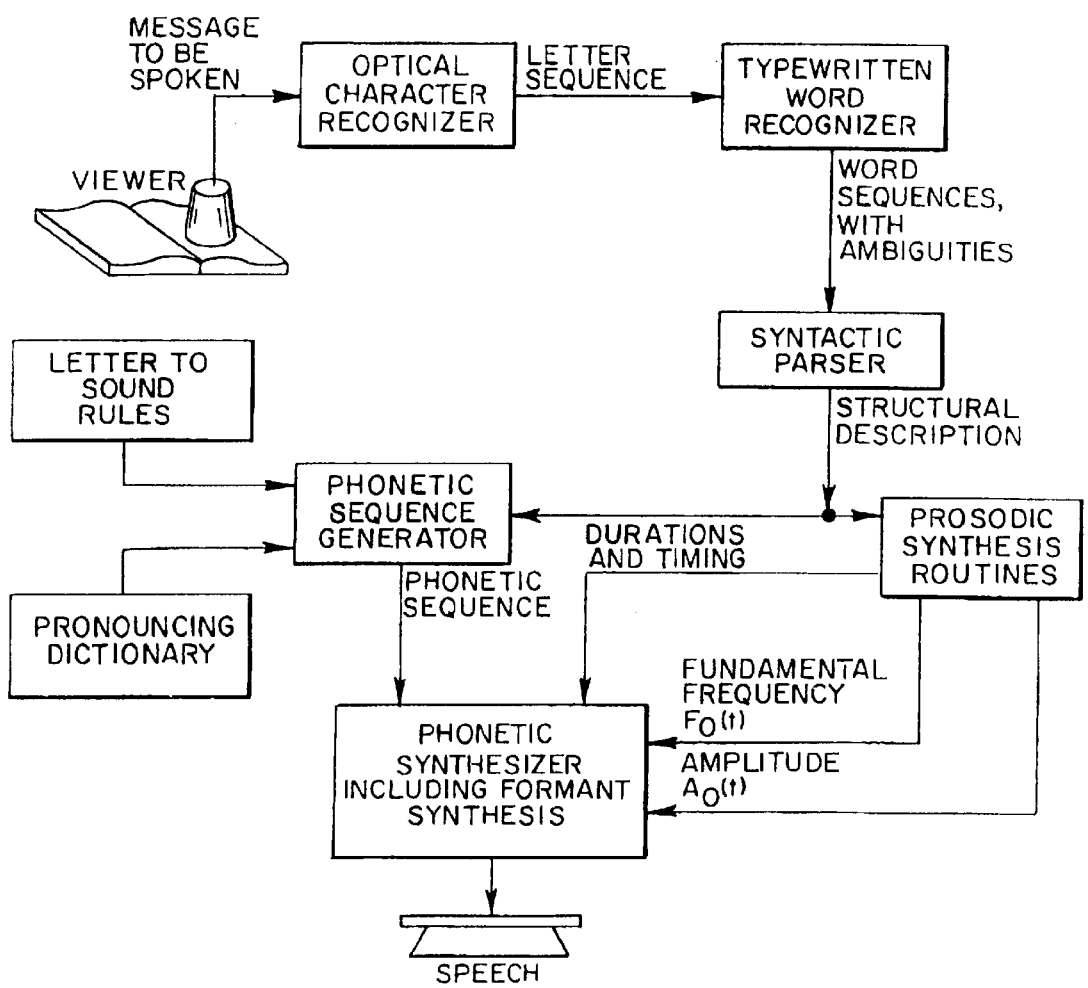
FIG. 21A is a prior art flow chart for a text-to-speech system for generating complex sentences with large vocabularies.
Figure 21B:
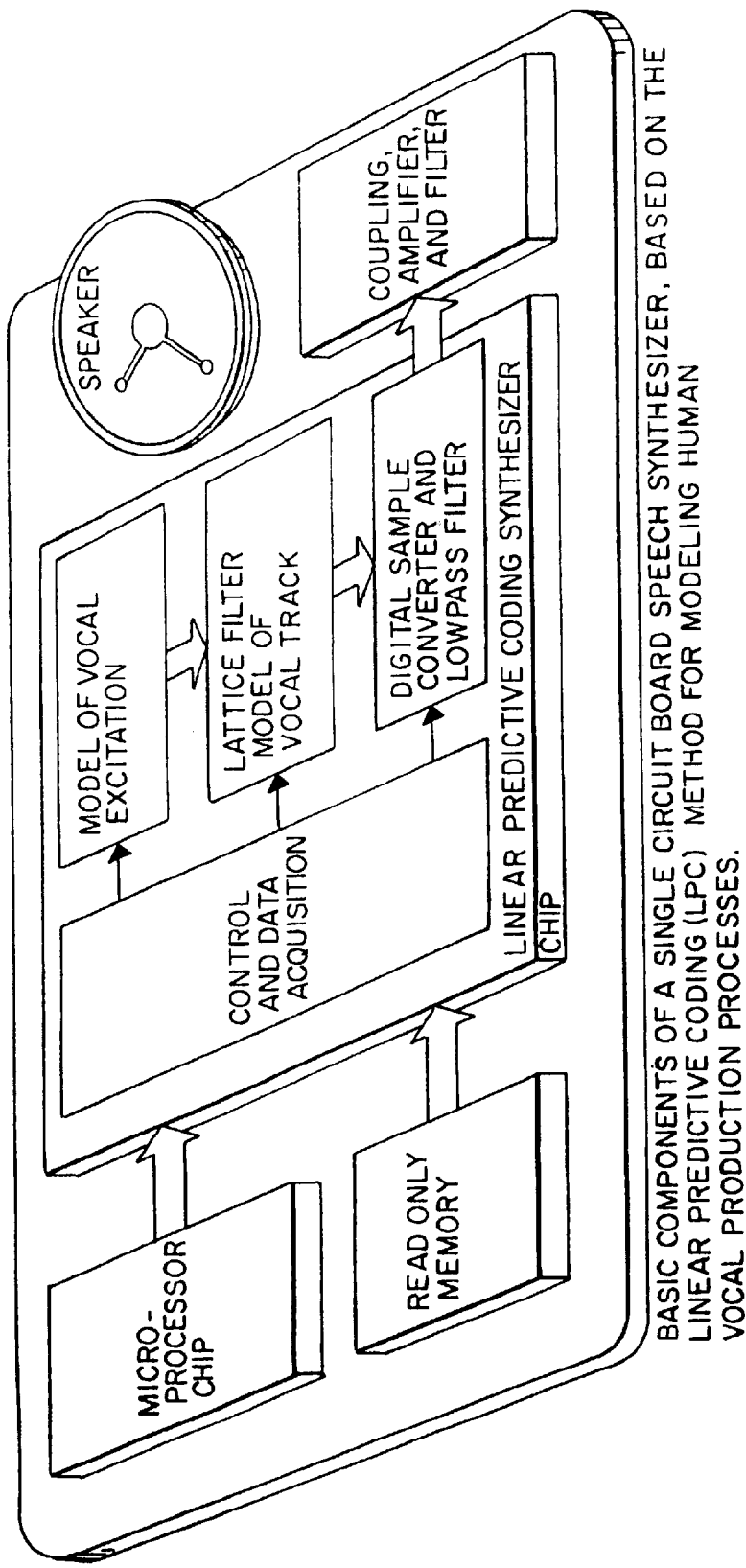
FIG. 21B is a diagrammatic view of the basic components of a single circuit board prior art speech synthesizer, based on the linear predictive coding (LPC) method for modeling human vocal production processes.

J. FIGS. 17A and 17B

FIG. 17A shows a flow chart for an antiskid mechanism 414, where such antiskid mechanism may be activated in response to a decision made by a control intervention system 410. FIG. 17B shows that an antiskid mechanism 414 may throw down dirt or sand S or some other particulate in front of each of the tires of the vehicle 28.

K. FIGS. 18, 19A, 19B, 20A, 20B, 20C, 21A and 21B

FIGS. 18, 19A, 19B, 20A, 20B, 20C, 21A and 21B show various features of interactive voice response systems.

L. FIG. 22

Figure 22:
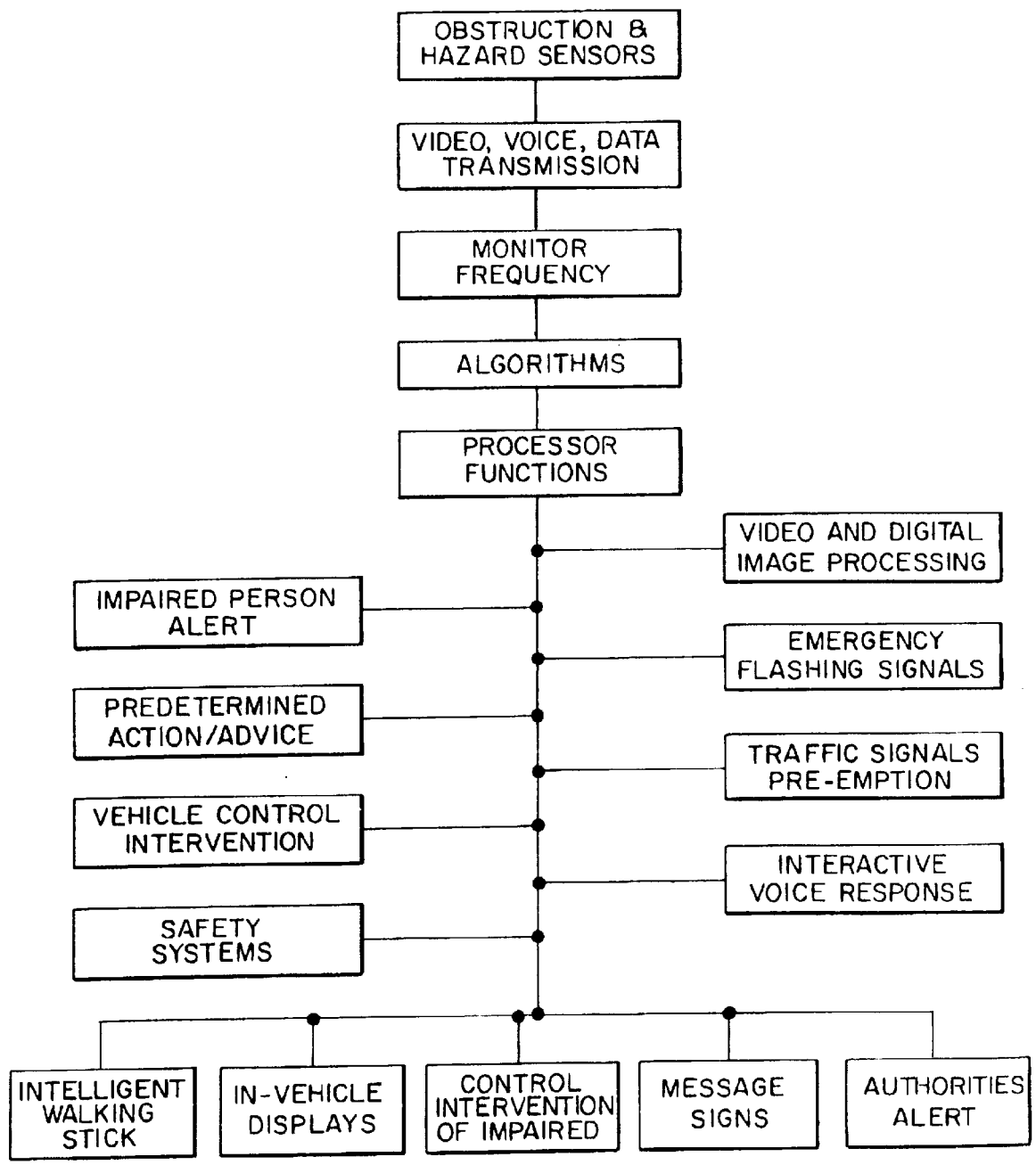
FIG. 22 is a flow chart of functions performed and results obtained by intelligent seeing, hearing, and safety systems such as the intelligent walking stick of FIG. 12B.

FIG. 22 is a flow chart of functions performed by intelligent seeing, hearing, and safety systems. Included is a walking stick and/or on-person sensors & scanners capable of imaging and sensing the surrounding scene. Further included are active and passive electronic tags, and infrastructure-based components around obstructions and hazards that warn the impaired person by transmitting warnings and instructions. Algorithms initiate or advise appropriate actions depending on the characteristics of the impaired person. Further, video and digital image processing systems recognize traffic signals and advise when it is safe for the impaired person (child, senior, anyone who carries or wears on-person sensors and/or scanners) to proceed. Further, when the impaired person begins to cross a street, surrounding vehicles are warned (advised) of his/her presence and/or controlled to avoid hitting the individual(s). Further, sensors and scanners feed into computerized decision support algorithms and determine if automatic control of a vehicle(s) will be activated. Further, the exact position of a threatening vehicle(s) is located using navigational and communication technologies. Further, a processor activates a vehicle's control-intervention system to avoid hitting the impaired person (child, senior, anyone wearing or carrying presence indicators and/or processors, including sensors and processors built into footwear and clothing, or other sensors and scanners) when an accident is imminent. Further, impaired persons and others carry or wear on-person silent alarms (transmitters) and connected microphones for their personal safety, and are monitored by police and/or central dispatch as requested or necessary.

Figure 23:
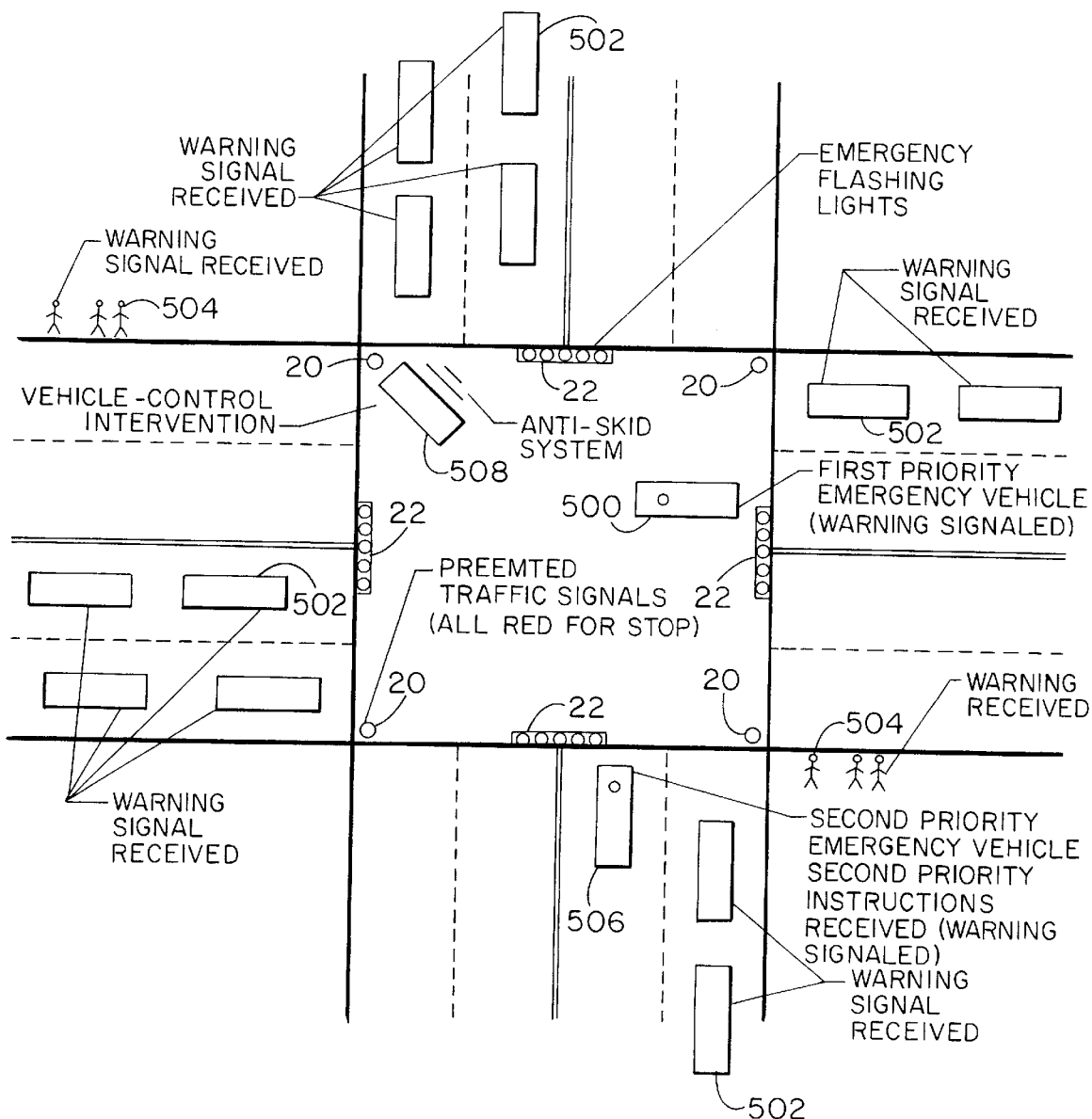
FIG. 23 is a diagrammatic view of how the emergency flashing light mechanism may control traffic at an intersection.
Figure 24:
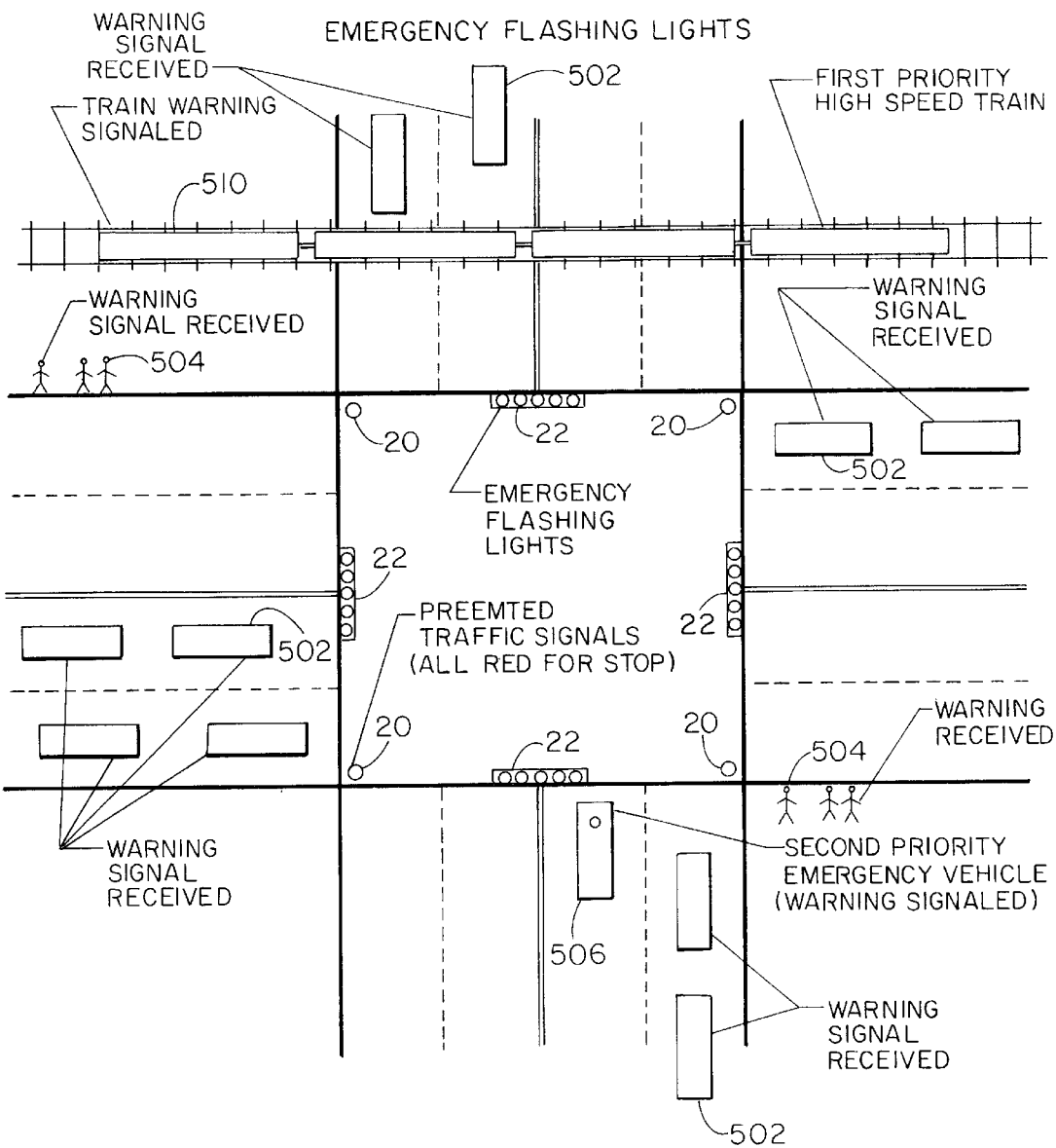
FIG. 24 is a diagrammatic view of how the emergency flashing light mechanism may control traffic at an intersection where the intersection includes a railroad crossing.

M. FIGS. 23 and 24 and Emergency Light Flashing Mechanisms 22

The emergency flashing light mechanism 22 receives real-time data (analog or digital) from transducers, sensors, and other data sources that monitor emergency vehicle signals, other right-of-way vehicles and trains, compares the data with predetermined standards, and then signals and sounds warnings to local drivers and pedestrians, changes all traffic signals in the intersection or intersections to red and gives "go-ahead" signals to emergency vehicles (right-of-way) vehicles) in the order of their predetermined priority.

Processor functions of the emergency flashing light mechanism 22 include receiving real-time data (analog or digital) from transducers, sensors, and other data sources that monitor emergency vehicle signals and other right-of-way vehicles and trains, maintaining decoding or encryption software to decode ID signals from authorized vehicles, comparing data with predetermined standards, determining if vehicle-control intervention will be activated to avoid a collision, maintaining predetermined response plans, determining if automated vehicle anti-skid systems will be activated, determining if pre-collision safety restraints will be deployed when an accident is imminent, giving advance warnings and instructions according to predetermined protocol when emergency vehicles and trains of identical priorities are converging. The processor of the emergency flashing light mechanism may feed information into and receive information from sensor based systems. The processor of the emergency flashing light mechanism may feed. information into and receive information from warning devices.

The emergency flashing light mechanism 22 can change all traffic signals (such as control light mechanisms) in an intersection or intersections to red, can give "go-ahead" signals to a vehicles such as emergency vehicles or right-of-way vehicles in order of their predetermined priority, can alert local drivers and pedestrians by sounded and displayed warnings and instructions (including interactive voice response communications) of approaching emergency vehicles, can give a "go-ahead" priority to a train traveling at a high rate of speed over other right-of-way vehicles, can activate vehicle-control intervention when a collision is imminent (if not activated by an involved vehicle or vehicles), can deploy pre-collision safety restraints when a collision is imminent (if not activated by an involved vehicle or vehicles), can activate automated vehicle anti-skid system when a collision is imminent and conditions are slippery (if not activated by an involved vehicle or vehicles), can receive activating signals that are transmitted from the infrastructure and other sources, and can change all traffic signals in the intersection or intersections to red when sensing a vehicle that is out or control such as abnormal behavior or vehicle malfunction.

Processor functions of the emergency flashing light mechanism 22 further include employing global positioning satellites for updated coordinates and the utilization of land information systems to provide dynamic, visually enhanced pictures of the surroundings, and to guide a vehicle or vehicles (when vehicle-control intervention has been invoked) to positions where harm is unlikely or less likely to occur, receiving and processing vehicle identification numbers, receiving and processing information on the location, speed and direction of vehicles, maintaining information on emission standards, maintaining information on relationships between numbers of vehicles and levels of emissions, maintaining vehicle counts for a given interval or given period of time, enhancing dynamic vision of imaged and scanned scene, when warning signals are received, by automatically zooming in on the area of danger, preempting traffic signals controlled by auto vehicle counts to minimize unacceptable emissions levels, preempting traffic signals controlled by automatic vehicle counts to facilitate traffic control, and logging, identifying and classifying emissions data. The processor of the emergency flashing light mechanism may feed information into and receive information from sensor based systems. The processor of the emergency flashing light mechanism may feed information into and receive information from warning devices.

The emergency flashing light mechanism 22 further can preempt local traffic signals depending on the kind of right-of-way vehicles, their priorities, and alert messages, can intervene to hold or change and hold as appropriate traffic signals from changing once an impaired person has entered the intersection, and can advise emergency vehicles or right-of-way vehicles that the immediate roadway in front and the up-coming intersection are or are not clear to proceed. The received information, instructions and displays of the vehicles and trains indicate the position and proximity of the right-of-way vehicles and trains relative to each other and all other vehicles in the vacinity receiving the transmission or alert.

FIGS. 23 and 24 show emergency flashing lights 22 and control light mechanisms 20 regulating traffic. FIG. 23 shows the intersection of two roads. FIG. 24 shows the intersection of two roads and further shows the intersection of a train with one of the roads. In FIG. 23, the emergency flashing light mechanism 22 begins to control the intersection for a relatively great time prior to when the first priority emergency vehicle 500 has reached the intersection. For example, prior to when the emergency vehicle 500 arrives at the intersection, the emergency flashing light mechanism 22 sends and receives information such as warning signals to and from vehicles 502, preempts the control or signal light mechanisms 20, sends and receives information such as warning signals to and from pedestrians 504, sends and receives information to and from second priority emergency vehicle 506, and begins to flash the lights of the emergency flashing lights 22. Further, as the first priority emergency vehicle begins to enter or actually enters the intersection, the flashing light mechanism 22 may take over control of a vehicle 508 and may employ an anti-skid mechanism on the vehicle 508. After the first priority emergency vehicle 500 exits the intersection, the emergency flashing light mechanism 22 sends and receives information to and from the second priority emergency vehicle 506 and permit such a vehicle to enter and exit the intersection. Then the flashing light mechanism 22 may send and receive information to and from the remaining vehicles 502, including vehicle 508, and permit such vehicles to enter and exit the intersection. The intersections of FIG. 24 are regulated in the same manner as the intersection of FIG. 23, except that the first priority vehicle is a train 510.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of the claims are intended to be embraced therein.

I claim:

1. A traffic light mechanism for a traffic complex, wherein the traffic complex includes components, wherein the components include vehicles, pedestrians and control light mechanisms, wherein said control light mechanism comprises red, yellow, and green lights, wherein the traffic light mechanism comprises:
   a) an emergency flashing light processor;
   b) an emergency flashing light transmitter in communication with at least one component of the traffic complex;
   c) an emergency flashing light receiver in communication with at least one component of the traffic complex;
   d) an emergency flashing light operating in response to information received from at least one component of the traffic complex and wherein the emergency flashing light mechanism can override an operation of at least one component of the traffic complex; and
   e) a video surveillance mechanism, wherein the emergency flashing light mechanism is in communication with the video surveillance mechanism, and wherein said video surveillance mechanism may zoom in on a particular location based on information received from said components of the traffic complex.

2. The traffic light mechanism according to claim 1, wherein the emergency flashing light mechanism is in communication with a vehicle.

3. The traffic light mechanism according to claim 1, wherein the emergency flashing light mechanism is in communication with a pedestrian.

4. The traffic light mechanism according to claim 1, wherein the emergency flashing light mechanism is in communication with a control light mechanism.

5. A traffic light mechanism for a traffic complex, wherein the traffic complex includes components, wherein the components include vehicles, pedestrians and control light mechanisms, wherein said control light mechanism comprises red, yellow, and green lights, wherein the traffic light mechanism comprises:
   a) an emergency flashing light processor;
   b) an emergency flashing light transmitter in communication with at least one component of the traffic complex;
   c) an emergency flashing light receiver in communication with at least one component of the traffic complex;
   d) an emergency flashing light operating in response to information received from at least one component of the traffic complex and wherein the emergency flashing light mechanism can override an operation of at least one component of the traffic complex; and
   e) an emission sensor mechanism, wherein the emergency flashing light mechanism is in communication with the emission sensor mechanism.

6. The traffic light mechanism according to claim 1, wherein the emergency flashing light mechanism is in communication with a visual text indicator.

7. The traffic light mechanism according to claim 1, wherein the emergency flashing light mechanism is in communication with a public address speaker.

8. The traffic light mechanism according to claim 1, wherein the emergency flashing light mechanism is in communication with at least one component of the traffic complex via radar.

9. The traffic light mechanism according to claim 1, wherein the emergency flashing light mechanism is in communication with at least one component of the traffic complex via a global positioning system.

10. The traffic light mechanism according to claim 1, wherein the vehicles include emergency vehicles, and wherein the emergency flashing light mechanism selectively responds to said emergency vehicles.

11. The traffic light mechanism according to claim 1, wherein the vehicles have priorities assigned thereto, wherein the emergency flashing light mechanism includes a predetermined protocol for said vehicles having said priorities.

12. The traffic light mechanism according to claim 1, wherein the vehicles have identification numbers, and wherein the emergency flashing light mechanism receives and processes said identification numbers.

13. The traffic light mechanism according to claim 1, wherein the emergency flashing light mechanism is in communication with a vehicle of the traffic complex via radar.

14. The traffic light mechanism according to claim 1, wherein the emergency flashing light mechanism is in communication with a vehicle of the traffic complex via a global positioning system.

15. The traffic light mechanism according to claim 1, wherein the emergency flashing light mechanism is in communication with a pedestrian of the traffic complex via radar.

16. The traffic light mechanism according to claim 1, wherein the emergency flashing light mechanism is in communication with a pedestrian of the traffic complex via a global positioning system.

17. A traffic light mechanism for a traffic complex, wherein the traffic complex includes components, wherein the components include vehicles, pedestrians and control light mechanisms, wherein said control light mechanism comprises red, yellow, and green lights, wherein the traffic light mechanism comprises:
   a) an emergency flashing light processor;
   b) an emergency flashing light transmitter in communication with at least one component of the traffic complex;

c) an emergency flashing light receiver in communication with at least one component of the traffic complex;
d) an emergency flashing light operating in response to information received from at least one component of the traffic complex and wherein the emergency flashing light mechanism can override an operation of at least one component of the traffic complex; and
e) wherein the emergency flashing light mechanism is in communication with a vehicle of the traffic complex, and wherein the emergency flashing light mechanism controls the vehicle.

18. A traffic light mechanism for a traffic complex, wherein the traffic complex includes components, wherein the components include vehicles, pedestrians and control light mechanisms, wherein said control light mechanism comprises red, yellow, and green lights, wherein the traffic light mechanism comprises:
a) an emergency flashing light processor;
b) an emergency flashing light transmitter in communication with at least one component of the traffic complex;
c) an emergency flashing light receiver in communication with at least one component of the traffic complex;
d) an emergency flashing light operating in response to information received from at least one component of the traffic complex and wherein the emergency flashing light mechanism can override an operation of at least one component of the traffic complex; and
e) wherein the emergency flashing light mechanism is in communication with a vehicle of the traffic complex, and wherein the emergency flashing light mechanism controls an anti-skid system of the vehicle.

19. A traffic light mechanism for a traffic complex, wherein the traffic complex includes components, wherein the components include vehicles, pedestrians and control light mechanisms, wherein said control light mechanism comprises red, yellow, and green lights, wherein the traffic light mechanism comprises:
a) an emergency flashing light processor;
b) an emergency flashing light transmitter in communication with at least one component of the traffic complex;
c) an emergency flashing light receiver in communication with at least one component of the traffic complex;
d) an emergency flashing light operating in response to information received from at least one component of the traffic complex and wherein the emergency flashing light mechanism can override an operation of at least one component of the traffic complex; and
e) wherein the emergency flashing light mechanism is in communication with a vehicle of the traffic complex, and wherein the emergency flashing light mechanism controls pre-collision safety restraints of a vehicle.

20. The traffic light mechanism according to claim 1, wherein the emergency flashing light mechanism is in communication with the control light mechanism and with a vehicle, and wherein the emergency light mechanism controls the red light of the control light mechanism in response to a communication from said vehicle.

21. A traffic light mechanism for a traffic complex, wherein the traffic complex includes components, wherein the components include vehicles, pedestrians and control light mechanisms, wherein said control light mechanism comprises red, yellow, and green lights, wherein the traffic light mechanism comprises:
a) an emergency flashing light processor, wherein the emergency flashing light processor receives and processes information on the location, speed and direction of vehicles;
b) an emergency flashing light transmitter in communication with at least one component of the traffic complex;
c) an emergency flashing light receiver in communication with at least one component of the traffic complex;
d) an emergency flashing light operating in response to information received from at least one component of the traffic complex and wherein the emergency flashing light mechanism can override an operation of at least one component of the traffic complex; and
e) a global positioning satellite mechanism for receiving information on surroundings of the emergency flashing light mechanism including said information on the location, speed and direction of vehicles whereby information can be sent to said vehicles; and further comprising at least one of the vehicles, wherein said vehicle includes a mechanism permitting the emergency flashing light mechanism to take control of the vehicle whereby the vehicle may be remotely driven to a position where harm is less likely to occur to occupants of the vehicle.

22. A traffic light mechanism for a traffic complex, wherein the traffic complex includes components, wherein the components include vehicles, pedestrians and control light mechanisms, wherein said control light mechanism comprises red, yellow, and green lights, wherein the traffic light mechanism comprises:
a) a processor, wherein the processor receives and processes information on the number of vehicles;
b) a transmitter in communication with at least one component of the traffic complex;
c) a receiver in communication with at least one component of the traffic complex;
d) a light operating in response to information received from at least one component of the traffic complex and wherein the traffic light mechanism can override an operation of at least one component of the traffic complex; and
e) an emissions sensor in communication with the processor, wherein the traffic light mechanism processes information on relationships between the number of vehicles and levels of emissions for a given time period.

23. A traffic light mechanism for a traffic complex according to claim 22, wherein, in response to processing information on relationships between the number of vehicles and the levels of emissions for a given time period, said traffic light mechanism preempts said control light mechanism to regulate a flow of vehicles.

* * * * *